(12) United States Patent
Conner et al.

(10) Patent No.: US 10,847,140 B1
(45) Date of Patent: Nov. 24, 2020

(54) USING SEMANTICALLY RELATED SEARCH TERMS FOR SPEECH AND TEXT ANALYTICS

(71) Applicant: Noble Systems Corporation, Atlanta, GA (US)

(72) Inventors: Jason S. Conner, Stockbridge, GA (US); Christopher S. Haggerty, Atlanta, GA (US)

(73) Assignee: Noble Systems Corporation

( * ) Notice: Subject to any disclaimer, the term of this patent is extended or adjusted under 35 U.S.C. 154(b) by 203 days.

(21) Appl. No.: 16/179,312

(22) Filed: Nov. 2, 2018

(51) Int. Cl.
| | | |
|---|---|---|
| *G10L 15/18* | (2013.01) | |
| *G10L 15/06* | (2013.01) | |
| *G06F 3/0481* | (2013.01) | |
| *G10L 15/26* | (2006.01) | |
| *G06F 3/0482* | (2013.01) | |
| *G06F 16/31* | (2019.01) | |
| *G06F 40/247* | (2020.01) | |

(52) U.S. Cl.
CPC ........ *G10L 15/1815* (2013.01); *G06F 3/0482* (2013.01); *G06F 3/04817* (2013.01); *G06F 16/313* (2019.01); *G06F 40/247* (2020.01); *G10L 15/063* (2013.01); *G10L 15/26* (2013.01)

(58) Field of Classification Search
USPC .............. 704/7–10, 246, 247, 251, 252, 257
See application file for complete search history.

(56) References Cited

U.S. PATENT DOCUMENTS

| 10,574,601 | B2 * | 2/2020 | Shioya | H04L 51/04 |
|---|---|---|---|---|
| 2016/0012056 | A1 * | 1/2016 | Smyros | G06F 16/2272 707/728 |
| 2017/0053005 | A1 * | 2/2017 | Smyros | G06F 16/248 |
| 2017/0177713 | A1 * | 6/2017 | Smyros | G06F 16/338 |
| 2018/0011929 | A1 | 1/2018 | Unitt | |
| 2019/0044898 | A1 * | 2/2019 | Shioya | H04L 51/043 |

OTHER PUBLICATIONS

A Comprehensive Guide to Understand and Implement Text Classification in Python, Bansal, Shivam, https://www.analyticsvidhya.com/blog/2018/04/a-comprehensive-guide-to-understand-and-implement-text-classification-in-python/, Apr. 23, 2018.

(Continued)

*Primary Examiner* — Leonard Saint Cyr

(57) ABSTRACT

Various embodiments of the invention provide methods, systems, and computer program products for conducting analytics on a communication so that search terms and corresponding synonyms can be considered in a context. A user identifies search terms and synonyms for the terms are provided. The user selects one or more of the synonyms and a topic model is applied to the search terms and selected synonyms to identify topics. The user selects a topic and communications associated with the topic are identified. The words articulated during the communications are then analyzed to identify occurrences where the search terms and synonyms were articulated during the communications. A GUI is displayed representing one of the communications with a plurality of icons, each icon representing one of the occurrences. Accordingly, the user may select a particular icon and a portion of the communication containing the corresponding occurrence is played and/or displayed for the user.

15 Claims, 16 Drawing Sheets

(56) References Cited

OTHER PUBLICATIONS

A Survey of Topic Modeling in Text Mining, Algahamdi, Rubayyi and Alfalqu, Khalid, International Journal of Avanced Computer Science and Applications, vol. 6, No. 1, 2015.

An Intuitive Understanding of Word Embeddings: From Count Vectors to Word2Vec, https://www.analyticsvidhya.com/blog/2017/06/word-embeddings-count-word2veec/, Jun. 4, 2017.

Automatic Analysis of Call-center Conversations, Mishne, Gilad, Carmel, David, Hoory, Ron, Roytman, Alexey, and Soffer, Aya, Proceedings of the 2005 ACM CIKM International Conference on Information and Knowledge Management, Bremen, Germany, Jan. 2005.

Automatic Evaluation of Topic Coherence, Newman, David, Han Lau, Jey, Grieser, Karl, and Baldwin, Timothy, Human Language Technologies: The 2010 Annual Conference of the North American Chapter of the ACL, pp. 100-108, Los Angeles, CA, Jun. 2010.

Automatic Labeling of Multinomial Topic Models, Mei, Qiaozhu, Shen, Xuehua, and Zhai, Chengxiang, Department of Computer Science, Univerisity of Illinois at Urbana-Champaign, http://sifaka.cs.uiuc.edu/czhai/pub/kdd07-label.pdf, Feb. 21, 2008.

Beginners Guide to Topic Modeling in Python, Bansal, Shivam, https://www.analyticsvidhya.com/blog/2016/08/beginners-guide-to-topic-modeling-in-python/, Aug. 24, 2016.

Complete Guide to Topic Modeling: What is Topic Modeling?, https://nlpforhackers.io/topic-modeling/, Jan. 8, 2018.

Evaluation Methods for Topic Models, Wallach, Hanna, Murray, Iain, Salakhutdinov, Ruslan, and Mimno, David, ICML 09 Proceedings of the 26th Annual International Conference on Machine Learning, Jun. 14-18, 2009.

Exploring the Space of Topic Coherence Measures, Roder, Michael, Both, Andreas, and Hinneburg, Alexander, WSDM 15, Feb. 2-6, 2015, Shanghai, China.

Indexing by Latent Semantic Analysis, Deerwater, Scott, Dumas, Susan, Fornas, George, Landauer, Thomas, and Harshman, Richard, JASIS 41 (1990): 351-407, Sep. 1990.

Natural Language Processing State of the Art, Current Trends and Challenges, Khurana, Diksha, Koli, Aditya, Khatter, Kiran, and Singh, Sukhdev, Department of Computer Science and Engineering, Manav Rachna International University.

Perplexity to Evaluate Topic Models, Pleple, Quentin, http://qpleple.com/perplexity-to-evaluate-topic-models/, May 2013.

Recent Developments in Document Clustering, Andrews, Nicholas and Fox, Edward, Department of Computer Science, Virginia Tech, Oct. 16, 2007.

Text Analysis: Topic Modeling, Fall 2016.

Topick Modeling and Latent Dirichlet Allocation (LDA) in Python, Li, Susan, https://towardsdatascience.com/topic-modeling-and-latent-dirichlet-allocation-in-python-9bf156893c24. May 30, 2018.

Topic Modeling: Optimizing for Human Interpretability, Wisdom, Alyssa, https://medium.com/square-corner-blog/topic-modeling-optimizing-for-human-interpretability-48a81f6ce0ed, Dec. 20, 2017.

Understanding Semantic Analysis (and Why This Title is Totally Meta), Palani, Pradeep, https://zetaglobal.com/blog-posts/understanding-semantic-analysis-title-totally-meta/, Jan. 10, 2018.

* cited by examiner

Search Communications

Search Terms | Purchase refrigerator handle

| Recording ID | Agent | Date / Time | Applicable Topic | Select |
|---|---|---|---|---|
| DR1002345 | Mark Smith | Oct. 5, 2018 13:23 | Refrigerator purchase | ☐ |
| DR1003398 | Tim Rock | Oct. 2, 2018 11:15 | Refrigerator purchase | ☐ |
| DR2341001 | Scott Wilson | Sept. 23, 2018 13:01 | Commercial coolers | ☐ |
| DR3321548 | Claudia Romos | June 17, 2018 15:03 | Replacement parts | ☒ |
| DR8712001 | Scott Wilson | June 8, 2018 10:32 | Refrigerator purchase | ☐ |
| DR6573010 | Tim Rock | May 13, 2018 09:19 | Replacement parts | ☒ |
| DR1110324 | Mark Smith | Apr. 6, 2018 12:12 | Replacement parts | ☐ |
| DR4129787 | Peter Carey | Mar. 27, 2018 08:23 | Replacement parts | ☒ |
| DR5183090 | Scott Wilson | Mar. 1, 2018 10:11 | Replacement parts | ☒ |
| DR7652019 | Mark Smith | Feb. 14, 2018 08:47 | Replacement parts | ☒ |
| DR6591532 | Scott Goode | Feb. 3, 2018 13:12 | Refrigerator purchase | ☐ |
| DR1876321 | Peter Carey | Dec. 15, 2017 11:10 | Commercial coolers | ☐ |
| DR2964732 | Claudia Romos | Dec. 9, 2017 09:12 | Commercial coolers | ☐ |

Topic  Agent  Dates Start End

Apply Filters  Exit  Review

FIG. 14

USING SEMANTICALLY RELATED SEARCH TERMS FOR SPEECH AND TEXT ANALYTICS

BACKGROUND

Today, more and more contact centers are making use of analytics to investigate exchanges that occur on various communications involving agents and remote parties. For instance, many contact centers are making use of speech analytics to investigate exchanges that occur on audio communications such as telephone calls, as well as text analytics to investigate exchanges that occur on text-based communications such as Web chats and text messages. In fact, analytics technology has developed to the point that many contact centers are now performing some type of analytics on all or most of the communications that occur between agents and remote parties.

The typical approach in using speech and/or text analytics is to configure one or more terms (e.g., keywords) that are then searched for in a communication. These search terms are manually created and as a result, the success of conducting analytics on a communication is directly tied to the quality of these search terms. For example, telephone calls in a contact center may be monitored to ensure that agents are providing correct information to callers. Here, speech analytics can be used to detect a particular phrase spoken by the agents signaling the correct information was given to callers. However, agents may not always deliver the correct information using the monitored phrase.

For instance, agents may be instructed to inform callers of a sale involving a "limited offer" on a product. Here, the contact center may define the keyphrase "limited offer" for the speech analytics engine to listen for and a particular agent may be stating "one-time offer" instead of the defined phrase, although this agent is informing callers of the sale. As a result, this particular agent may be considered to be performing poorly just because the agent is using different terminology to inform callers of the sale. In this instance, a solution may be to have the speech analytics engine also listen for the phrase "one-time offer." However, this solution requires the contact center to anticipate all the different forms that agents may use to communicate the sale to callers and to configure phrases for all the different forms accordingly. Thus, a system administrator could configure the analytics engine for each of these various phrases, but doing so becomes difficult, time consuming, repetitive, and prone to error.

Another issue in using search terms for performing analytics is that many words in the English language (or other languages for that matter) have multiple meanings. For example, a manager at a contact center may wish to search recordings of several telephone calls that were conducted by agents and callers to identify instances in which the callers had called to purchase a product. Here, the manager may configure a speech analytics engine to listen to the recordings of the calls and identify instances where the caller used the term "buy" to signal he or she wanted to make a purchase. However, as a result, the engine would also identify instances in the recordings where the callers ended the calls by stating "bye." As a result, the manager is likely made to listen to recordings identified by the speech analytics engine as containing the search term that are not recordings of telephone calls in which callers wanted to make a purchase. In other words, the speech analytics engine is not able to ascertain the context in which the search term is spoken so that the engine can distinguish between uses of the search term when a caller wants to make a purchase and uses of the search term when a caller is simply ending the call.

Finally, because many contact centers today make use of several channels of communication, the volume of communications to analyze can be quite immense. In addition, the processing required by many analytics engines is extensive and therefore, having an analytics engine evaluate a large volume of communications can tax a contact center's resources. An option that can help to alleviate this problem is for a contact center to tag communications with information (e.g., metadata) on the context of the communications (topics) so that the volume of communications can be reduced when analytics are performed to identify certain occurrences of keywords. However, the tagging of communications with metadata usually is performed manually and can be quite time consuming. Therefore, the practicality of manually tagging communications is typically not feasible for many contact centers.

Therefore, a need exists in the relevant art for a solution that allows for enterprises to conduct analytics on a large collection of communications so that search terms can be considered in a context along with identifying communications in the large collection related to the context. It is with respect to these considerations and others that the disclosure herein is presented.

BRIEF SUMMARY

In general, embodiments of the present invention provide computer program products, methods, systems, apparatus, and computing entities for conducting analytics on a communication so that search terms and corresponding synonyms can be considered in a context. In various embodiments, a user identifies one or more search terms and one or more synonyms are provided to the user on a display of a computer for at least one of the search terms. For instance, in particular embodiments, the one or more synonyms may be identified from one or more general thesauruses and/or a personal thesaurus associated with the user. In addition, in particular embodiments, the user may be provided with one or more definitions for at least one of the search terms and the user is then provided with at least one of the synonyms based on the user's selection of a definition.

The user may then select one or more of the synonyms and corresponding topics are identified by applying a topic model to the search terms identified by the user and the selected synonyms. At this point, the user may select one or more of the topics and communications, such as telephone calls, associated with the selected topics are identified. The user may then analyze the words articulated during one of the communications (e.g., words spoken by parties during the calls) to identify occurrences where at least one of the search terms and the selected synonyms was articulated during the communication and as a result, a graphical user interface ("GUI") is displayed to the user with a timeline representing the communication and displaying a plurality of icons in conjunction with the timeline in which each icon represents one of the occurrences where at least one of the search terms and the selected synonyms was articulated during the communication.

In these particular embodiments, the icons are displayed on the GUI at locations with respect to the timeline proximate to the times of the occurrences where at least one of the search terms and the synonyms was articulated during the communication. Accordingly, the user may select a particular icon representing a particular occurrence and as a result, a portion of the communication containing the particular occurrence where at least one of the search terms and the synonyms was articulate during the communication is played and/or displayed for the user.

In particular embodiments, the topic model is trained by converting a plurality of communications into a plurality of text transcripts and converting the plurality of text transcripts into a matrix representation. Here, in these particular embodiments, the topic model is trained on the matrix representation to identify a plurality of topics in which each topic includes a cluster of similar words representing a latent semantic structure found in the communications and each word is weighted based on an importance of the word to the topic. In addition, in particular embodiments, the topics may be labeled. For instance, a set of candidate labels may be identified for a particular topic. Here, a score is produced for each of the candidate labels based on semantic relevance and one or more of the labels are selected for a particular topic with maximal marginal relevance criterion and with respect to a ranking of the score for each of the candidate labels.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 14 illustrates a fourth GUI used in accordance with various embodiments of the claimed invention.

DETAILED DESCRIPTION

Figure 1:
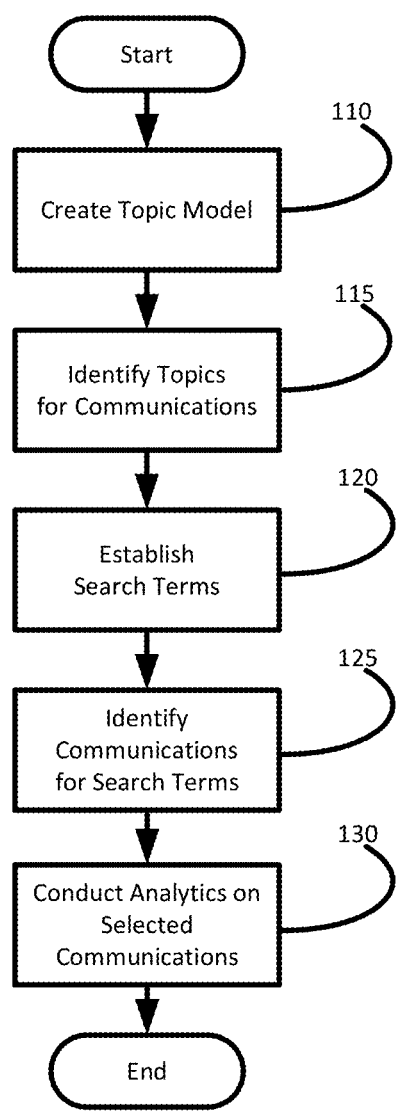
FIG. 1 illustrates a process flow for facilitating the ability to conduct analytics on a large collection of communications so that search terms can be considered in a context along with identifying the communications in the large collection related to the context in accordance with various embodiments of the claimed invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

General Overview

Various embodiments of the invention are concerned with facilitating the ability to conduct analytics on a large collection of communications so that search terms can be considered in a context along with identifying the communications in the large collection related to the context. A communication in a contact center can be viewed as an unstructured document (or unstructured text) because the information contained within a communication (e.g., a telephone call recording or transcript of a Web chat) typically does not have a pre-defined pattern or is not organized in a pre-defined manner. Instead, a contact center communication usually involves a free-form exchange between an agent and a remote party. This free-form exchange can also be referred to as natural language or ordinary language. Natural language is language that has evolved naturally in humans through use and repetition without conscious planning or premeditation. Thus, contact center communications can cover a wide range of topics and the information conveyed during these communications can vary greatly.

Natural language processing involves programming computers to process, analyze, and understand natural language. Although various analytics such as speech and text can be viewed as a type of natural language processing in that these types of analytics can identify words and phrases spoken by an agent and/or a party during a communication, as well as other parameters such as an emotion displayed by the agent and/or the party, speech and text analytics are not necessarily good at identifying contextual information about a communication.

With that said, some contact centers are able to identify contextual information for communications by gathering such information outside of using some type of analytics engine. For instance, a contact center may use certain telephone numbers that parties can call for certain types of telephone calls. For example, a contact center may use a first set of 1-800 numbers for parties to call to place an order, a second set of 1-800 numbers for parties to call who are seeking technical support, and so forth. In addition, a contact center may route communications to some type of automated system such as an interactive voice response ("IVR") system that gathers information from the parties before routing the communications to agents to handle. This gathered information may include contextual information. However, such sources still cannot provide contextual information for every situation that may occur during communications because of the unstructured nature of such communications.

Therefore, various embodiments of the invention involve using some type of mechanism to identify contextual information for communications that is not necessarily discoverable through conventional practices adopted by contact centers. Specifically, various embodiments of the invention make use of natural language processing known as clustering to identify groupings for various communications (e.g., classes and/or topics) so that such groupings can then be used to identify a set of communications to analyze for a particular context related to a set of search terms.

Clustering involves the use of sets of words as descriptors to describe the contents within a cluster of documents (texts). Clustering may be performed using a hierarchical-based algorithm that involves clustering documents into a hierarchical structure by aggregating or dividing or a K-means algorithm and its variants. Generally speaking, a hierarchical-based algorithm produces more in-depth information for detailed analysis than algorithms based around variants of the K-means algorithm. However, hierarchical-based algorithms can suffer from efficiency issues and in many instances, the variants of the K-means algorithm provide sufficient information without having to deal with the efficiency issues that can be encountered using a hierarchical-based algorithm.

These algorithms can be further classified as hard or soft clustering algorithms. A hard clustering algorithm performs a hard assignment that is to say, a hard clustering algorithm assigns a document to exactly one cluster. However, a soft clustering algorithm assigns a document to a distribution over all clusters. Therefore, under a soft assignment, a document has fractional membership in several clusters.

Further, dimensionality reduction methods can be applied to soft clustering to help in reducing the number of variables that are considered for a document. One such method is topic models. Topic models can be used to discover the abstract "topics" that occur in a collection of documents. Accordingly, topic models are frequently used for discovering the hidden semantic structures in a document. The "topics" produced through topic modeling are groups (clusters) of similar words. Intuitively, given that a document is about a particular topic, one would expect particular words to appear in the document more or less frequently. Thus, a topic model captures this intuition in a mathematical framework that allows examining a set of documents and discovering what the topics might be and what each document's balance of topics is based on the statistics of the words in each document. Thus, topic models can discover the latent semantic structures of a large collection of unstructured documents and therefore, help to organize and provide insight for such a collection.

For instance, Latent Semantic Analysis ("LSA") is a kind of topic modeling. LSA is a technique of analyzing relationships between a set of documents and terms the documents contain by producing concepts related to the documents and the terms. LSA is based on the premise words that are close in meaning will occur in similar pieces of text. Latent Semantic Indexing ("LSI") is an information retrieval technique using the latent semantic structure. Specifically, LSI uses a mathematical technique called singular value decomposition to identify patterns in the relationships between the terms and concepts contained in an unstructured collection of documents (texts) and is based on the principle that words are used in the same context tend to have similar meanings. A key feature of LSI is its ability to extract the conceptual content of a body of text by establishing associations between those terms that occur in similar contexts.

Another kind of topic modeling is Latent Dirichlet Allocation ("LDA"). This is the most popular topic modeling technique. LDA assumes documents are produced from a mixture of topics. Those topics then generate words based on their probability distribution. Given a collection of documents, LDA backtracks and tries to figure out what topics would create the documents in the collection. LDA is a matrix factorization technique in that the collection of documents is made to be represented as a document-term matrix. In turn, LDA converts this document-term matrix into two lower dimensional matrices, a document-topics matrix and a topic-terms matrix, and then uses sampling techniques to improve these matrices.

Specifically, LDA iterates through each word for each document in the collection and tries to adjust the current topic-word assignment with a new assignment. A new topic is assigned to a word with a new probability that is the product of two probabilities. For every topic, the first of these two probabilities is the proportion of words in the document that are currently assigned to the topic and the second of these two probabilities is the proportion of assignments to the topic over all documents that come from the word. Accordingly, the current topic-word assignment is updated with the new topic with the new probability. Here, the model assumes that all the existing word-topic assignments except the current word are correct and therefore, it makes sense to adjust the current word's topic with the new probability, which is essentially the probability that the new topic generated the current word. After a number of iterations, a steady state is achieved where the document-topic and topic-term distributions are fairly good. This is the convergence point of the LDA.

Various embodiments of the invention make use of a clustering technique to identify the topics found in a collection of communications so that the identified topics can be used to filter the collection of communications to a more manageable set of communications to analyze based on one or more search terms identified by a user. A context is inferred from the search terms that is then used to identify related topics and these related topics are then used to filter the collection of communications.

Turning now to FIG. 1, a general process flow is provided for facilitating the ability to conduct analytics on a large collection of communications so that search terms can be considered in a context along with identifying the communications in the large collection related to the context in accordance with various embodiments of the invention. Here, the process begins with creating a clustering model such as a topic model for the collection of communications in Step 110. In various embodiments, this step involves modelling the text found in a representative group of communications to construct a group of words that represent a particular topic portrayed in the communications. That is to say, a group of words is developed for each topic found in the communications.

Once created, the topic model can then be apply to particular communications to identify the topic(s) for the communications in Step 115. For example, when a new communication has been completed between an agent and a party, the topic model is then applied to the text of the communication to identify the topics for the communication. Generally speaking, the output from applying the topic model in various embodiments is a factor value for each topic identifying a level of applicability the particular topic has to the communication. This is because topic modeling considers documents as being generated by a mixture of the topics. Accordingly, the larger the factor for the topic, the more applicable the topic (the respective document was generated by the topic). Therefore, in particular embodiments, the topics identified for (assigned to) a particular communication may encompass the topics in the topic model with factors (individually or summed) above a defined threshold value or percentage.

Accordingly, as a result of the above steps, each communication found in a collection of communications conducted for a contact center will have a set of topics identified (assigned to the communication) that represent the various contexts found in the communication. As a result, an individual is now able to analyze a certain portion of the communications that are identified as containing a particular context. This allows the individual to narrow down the number of communications that he or she needs to analyze for a particular purpose to a more manageable size rather than having to conduct an analysis on the entire collection of communications for the contact center.

Therefore, an individual (e.g., an administrator) may decide to conduct a search on the communications of a contact center involving telephone calls made by remote parties to the contact center's customer service and establish one or more search terms in Step 120. In this search, the individual would like to identify instances in the calls where the remote parties had made a purchase during the calls. The individual enters the search term "buy" and "purchase" to identify instances in the phone calls when an agent or a party utter the words "buy" and/or "purchase," signaling the party made a purchase.

Here, in particular embodiments, the individual is then provided with a list of synonyms for each of the search terms. For instance, returning to the example, the individual may be provided with a list of synonyms for each search term that includes "acquire, set, market, obtain, procure, purchase, take" for the term "buy" and "acquire, earn, invest, pick up, procure, redeem, stop, take" for term "purchase." The individual may then select any additional terms from the two lists to include in the search terms, thus allowing the search of the telephone calls to be conducting using other expressions (terms) an agent and/or a party may have used during a call when the party was making a purchase. Accordingly, the individual may identify the additional terms "acquire," "procure," and "redeem" from the two lists of synonyms.

In addition, in particular embodiments, the individual may have developed a personal thesaurus for certain terms based on similar searches conducted in the past. For instance, in this example, the individual may have a personal thesaurus that includes the phrase "pay for" for the term "purchase." Therefore, the individual may also select the phrase "pay for" to include along with the other selected search terms.

Finally, in particular embodiments, the individual may be provided with definitions for search terms that have more than one meaning. For instance, the individual may have provided the search term "object." In response, embodiments of the invention recognize the term has multiple meanings and offers the multiple meanings to the individual so that the individual can identify which meaning is applicable to the individual's search. Therefore, in the example, the individual may be provided with a first definition of "a material thing that can be seen and touched (n)" and a second definition of "say something to express one's disapproval of or disagreement with something (v)." In response, the individual may identify the first definition as applicable and a list of synonyms that includes "article, body, commodity, item, matter, phenomenon, something, substance" may be provided accordingly.

Once the search terms have been identify, the communications related to the search terms are identified in Step 125. Here, in various embodiments, the individual is initially provided with a list of topics that are related to the search terms and the individual selects the applicable topics from the list. In particular embodiments, the list of topics is constructed by applying the topic model to the search terms to identify which of the topics are more associated with the search terms. That is to say, the topics on the list are based on the topic model developed in Step 110. Further, in particular embodiments, each of the topics is identified with one or more labels and these labels are what is shown to the individual to select from in the list. Therefore, the individual selects one or more topics from the list and as a result, the collect of telephone calls is narrowed down in the example to the telephone call associated with one or more selected topics.

Finally, the individual then conducts the desired analytics on the narrowed down set of communications in Step 130. For instance, in the example, the individual has speech analytics performed on the selected telephone calls using the search terms "buy," "purchase," "acquire," "procure," "redeem," and "pay for" to identify instances in these telephone calls where the agent and/or the party spoke one of the search terms. Accordingly, the individual can then review the telephone calls that are identified has having such an instance to listen if a purchase was made during the call and if so, what transpired between the agent and the party that facilitated the purchase. Such analysis and review may help the individual to learn what actions and words can be provided by agents in future calls to facilitate purchases. The steps described in the general overview and shown in FIG. 1 are now further detailed herein.

Exemplary Architecture for Contact Center

Figure 2:
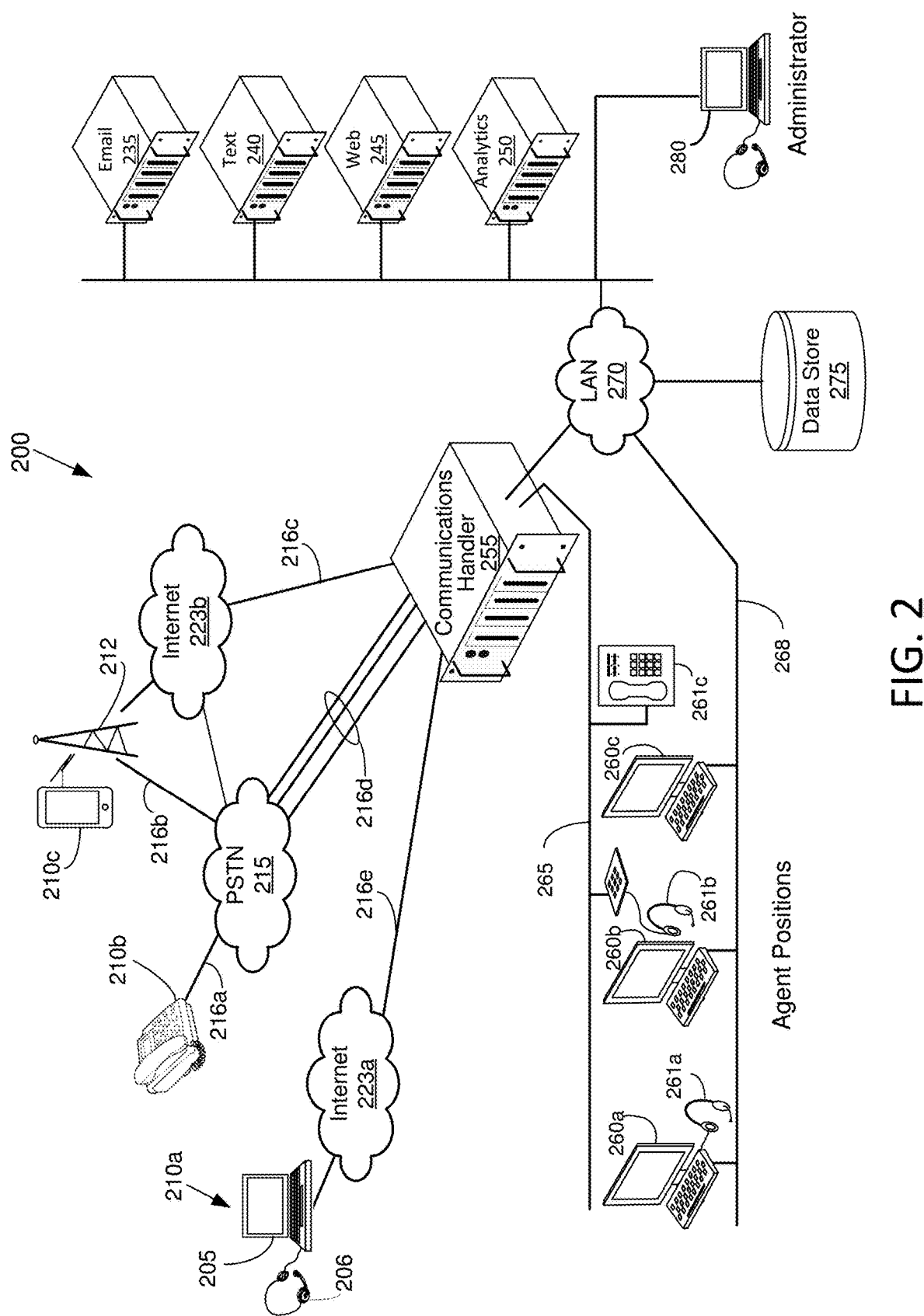
FIG. 2 illustrates an embodiment of an architecture that may be employed in accordance with various technologies and concepts disclosed herein.

FIG. 2 illustrates a contact center architecture 200 that may be used in accordance with the various technologies and concepts disclosed herein. The contact center architecture 200 shown in FIG. 2 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 210b connected to a public switched telephone network ("PSTN") 215 using an analog plain old telephone service ("POTS") line 216a. The calls may be routed by the PSTN 215 and may comprise various types of facilities 216d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 210c, such as a smart phone, tablet, or other mobile device, which wirelessly communicates with a mobile service provider ("MSP") 212. The voice calls may be routed to the PSTN 215 using an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223b using Internet-based protocols, such as SIP or H.323 protocols. For convenience, unless indicated otherwise, the term "trunk" refers to any type of facility 216c, 216d, 216e providing voice calls to, or from, the contact center, regardless of the type of protocol or technology used. Specifically, a "trunk" is not limited to time-division multiplexing ("TDM") technology, but could refer to various VoIP communication channels.

Inbound voice calls may also originate from a calling party employing a so-called "IP phone," "VoIP phone," or "soft phone" 210a. In particular embodiments, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such as session initiated protocol ("SIP") and the call may be conveyed by an Internet provider 223a. Those skilled in the art will recognize that a variety of Internet Protocols ("IP") and facilities may be used to convey voice calls.

The term "voice call" may encompass a voice call using any form of currently available technology and/or originating from any type of device, such as a soft phone 210a, a conventional telephone 210b, a mobile phone 210c, or other device known in the art. The term "call" as used herein may encompass an active instance of two-way communication, an attempt to establish two-way communication, or a portion of the two-way communication. For example, a user at a conventional telephone 210b can dial a voice call in an attempt to establish two-way communication, and a call can be said to exist even prior to establishment of the two-way connection.

In various embodiments, inbound voice calls from calling parties to the contact center may be received at a communications handler 255, which could be, for instance, an automatic call distributor ("ACD"). In particular embodiments, the communications handler 255 may be a specialized switch for receiving and routing inbound calls under various conditions. Further, the communications handler 255 may be embodied as a dedicated form of equipment readily available from various manufacturers, or the communications handler 255 may be a so-called "soft switch" comprising a suitable programming module executed by a processing device to perform the necessary specialized functions. The communications handler 255 may route an incoming call over contact center facilities 265 to a phone device used by an available agent for servicing. Depending on the embodiment, the facilities 265 may be any suitable technology for conveying the call, including but not limited to a local area network ("LAN"), wide area network ("WAN"), ISDN, or conventional TDM circuits. In addition, the facilities 265 may be the same or different from the facilities used to transport the call to the communications handler 255.

The physical area at which the agent sits is often referred to as an agent "position" and these positions are often grouped into clusters managed by a supervisor, who may monitor calls and the agents' productivity. An agent typically uses a specially configured computing device 260a-260c, such as a computer with a display, and a voice device 261a-261c that is adapted for various contact center functions associated with processing communications. For instance, the voice device 261a-261c may be a soft phone device exemplified by a headset 261a connected to the computer 260a. Here, the soft phone device may be a virtual telephone implemented in part by an application program executing on the computer 260a. Further, the phone may also comprise an Internet Protocol ("IP") based headset 261b or a conventional phone 261c. Use of the term "phone" is intended to encompass all these types of voice devices used by an agent, unless indicated otherwise.

The combination of computing device 260a-260c and voice device 261a-261c may be referred to as a "workstation." Thus, for these particular embodiments, the workstation collectively has a data capability and a voice capability, although separate devices may be used. Here, data may be provided to an agent's workstation computer 260a-260c over facilities 268 along with routing the call to the agent's workstation voice device 261a-261c over other facilities 265. In some instances, "workstation" may be used in reference to either the data or voice capability at the agent's position. For example, "routing the call to the agent's workstation" means routing a call to the voice device 261a-261c at the agent's position. Similarly, "routing the call to the agent" means routing a call to the appropriate equipment at an agent's position. The workstation typically has a display provided via a computer monitor. This is used to convey information to the agent about the calls, and the agent may interact with the communications handler 155 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 255 to allow the contact center (including the communications handler 255) to know which agents are available for handling calls. In particular embodiments, the communications handler 255 may also maintain data on an agent's skill level that may be used to route a specific call to the agent or group of agents having the same skill level. The communications handler 255 may also know what types of channels and combinations of channels the agent can handle.

Accordingly, in various embodiments, the communications handler 255 may place a call in a queue if there are no suitable agents available to handle the call, and/or the handler 255 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 275 to retrieve or provide information for processing the call. In other configurations, the IVR may be used to only provide announcements.

As noted, the contact center may also receive non-voice communications such as, for example, texts (short messaging service ("SMS") and/or multimedia messaging service ("MMS")), emails, and chats. For instance, text messages may be sent by parties using smart phones 210*c* over a MSP 212 and the Internet 223*b* and are received by a text gateway server 240. Once received, the text gateway server 240 in particular embodiments may inform the communications handler 255 of the text messages and the handler 255 may then queue up the text messages for appropriate agents.

In other embodiments, the contact center may make use of one or more components separate from the handler 255, such as a communications router (not shown) that instead handles the routing of various communications to agents. For instance, in these particular embodiments, the text gateway server 240 may instead inform a communications router of the text messages and the router may then queue up the text messages for appropriate agents. Similarly, the communications handler 255 may also inform the communications router of various calls so that the router can then queue up the calls for appropriate agents. However, with that said, the remainder of the specification makes reference to a communications handler 255 to carry out such functionality, although it should be understood that portions of the communications handler's 255 functionality may be performed by one or more other components within the contact center architecture 200.

Similarly, emails may be sent by users over the Internet 223*a*, 223*b* to an email server 235, and the email server 235 may inform the communications handler 255 of the emails so that the communications handler 255 can queue up the emails for appropriate agents. With respect to chats, in various embodiments a party can request a chat by accessing a website via a Web server 245. In turn, the Web server 245 informs the communications handler 255 of the chat and the handler 255 queues the appropriate agent to handle the chat.

Depending on the embodiment, the interactions between the various components shown may involve using a local area network ("LAN") 270. However, other configurations are possible, such as, but not limited to, using a wide area network, wireless network, router, bridge, direct point-to-point links, etc. Furthermore, in lieu of using facilities 265 directly linked to the communications handler 255 for conveying audio to the agents, other facilities 268 associated with the LAN 270 may be used.

In addition to receiving inbound communications, the contact center may also originate communications to parties, referred to herein as "outbound" communications. For instance, in particular embodiments, the communications handler 255 may be a dialer, such as a predictive dialer, that originates outbound calls at a rate designed to meet various criteria. Here, the communications handler 255 may include functionality for originating calls, and if so, this functionality may be embodied as a private automatic branch exchange ("PBX" or "PABX"). In addition, the communications handler 255 may directly interface with voice trunks using facilities 216*c*, 216*d*, 216*e* to the PSTN 115 and/or Internet provider 223*a*, 223*b* for originating calls. After the calls are originated, the communications handler 255 may perform a transfer operation to connect the calls with agents, a queue, or an IVR. Furthermore, in various embodiments, the communications handler 255 may make use of one or more algorithms to determine how and when to dial a list of numbers so as to minimize the likelihood of a called party being placed in a queue while maintaining target agent utilization. In similar fashion, the email server 235, text gateway server 240, and the Web server 245 can be utilized in various embodiments to originate outbound emails, text messages, and chats with parties.

In various embodiments, the communications handler 255 determines which agent is authorized and available to handle a communication upon being made aware of a voice or non-voice communication, and thereafter appropriately coordinates any response to the communication. In addition, the communications handler 255 may also make use of one or more schemes in allocating communications to agents such as, for example, on a round-robin basis, a least-number-served basis, a first available agent basis, and/or a seniority basis.

Furthermore, in various embodiments, the architecture 200 includes one or more analytics components 250 such as speech and/or text analytics components. In these embodiments, the analytics components 250 are used to analyze communications to identify when a particular word or phrase is detected in the communications. This word or phrase is referred to as a "keyword," although use of the term "keyword" should not be construed as limiting recognition to a single word. Further, a workstation 280 may be connected to the network that can be used by some personnel of the contact center, such as an administrator, who makes use of these analytics components 250.

For instance, the analytics component 250 may be a speech analytics component that analyzes the audio of telephone calls (or other types of audio communication) to detect keywords that are spoken on the calls by either remote parties or agents. Here, a number of different analytics approaches may be employed by the speech analytics component depending on the embodiment. For example, the speech analytics component may make use of one or more of a phonetics approach, large-vocabulary continuous speech recognition (LVCSR) approach, and/or direct phrase recognition approach in performing voice analytics on the phone call.

While in other instances, the communications may be exchanges of text messages or Web chat messages and the analytics component 250 may be a text recognition component that analyzes the text of the text or Web chat messages to detect keywords that are typed by either remote parties or agents. Here, for example, the text recognition component may make use of full-text search techniques or optical character recognition (OCR) to identify keywords in the text or Web chat messages.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 250 or other component may be combined into a single hardware platform executing one or more software modules. In addition, the contact center architecture 200 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 2 represents one possible configuration of a contact center architecture 200, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Topic Modeling Module

As previously mentioned, clustering involves the use of words as descriptors to describe the content with a cluster of documents. One of the clustering techniques that was previously discussed is topic modeling, and topic modeling is specifically discussed throughout the remainder of the application. However, those of ordinary skill in the art should understand that other clustering techniques may be used in various embodiments of the invention and therefore, the choice of using topic modeling should not be viewed as limiting the scope of the invention.

In addition, the disclosure provided herein uses the Latent Dirichlet Allocation ("LDA") approach for topic modeling. However, other approaches may be used in various embodiments of the invention such as Latent Semantic Analysis ("LSA"), Probabilistic Latent Semantic Analysis ("PLSA"), and Correlated Topic Model ("CTM"). Therefore, again, the choice of using DLA should not be viewed as limiting the scope of the invention.

Figure 3:
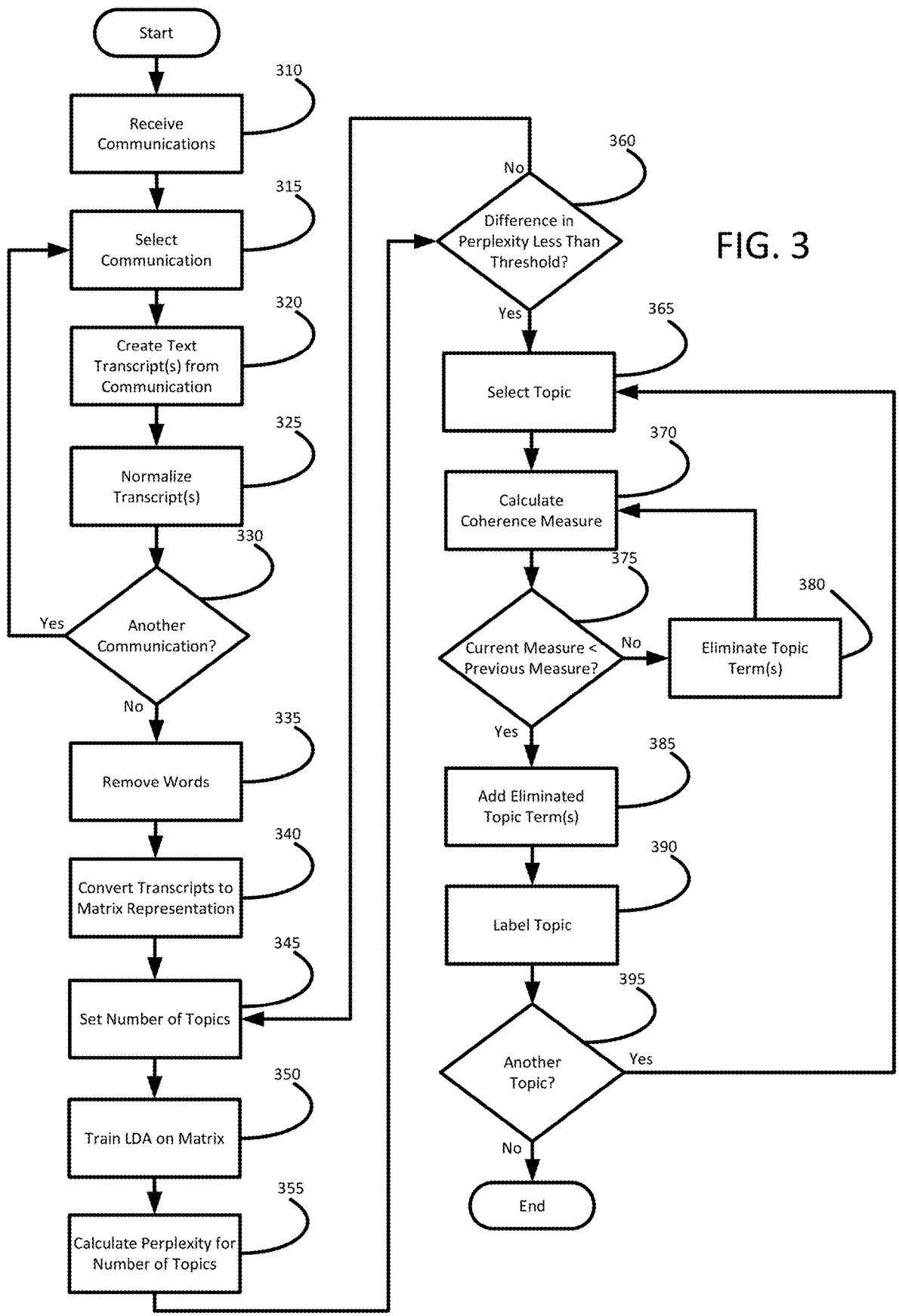
FIG. 3 illustrates a process flow for constructing a topic model in accordance with various embodiments of the claimed invention.

Turning now to FIG. 3, additional details are provided regarding a process flow for constructing a topic model based on a representative group of communications in accordance with various embodiments of the invention. In particular, FIG. 3 is a flow diagram of a topic modeling module for performing such functionality according to various embodiments of the invention. For example, the flow diagram shown in FIG. 3 may correspond to operations carried out by one or more processors in one or more components, such as the analytics component(s) 250 described above, as it executes the topic modeling module stored in the component's volatile and/or nonvolatile memory.

The process begins with the topic modeling module receiving the representative group of communications in Operation 310. Generally speaking, the representative group of communications should include a diverse arrangement of communications that cover a wide range of contextual situations encountered in the communications so that an appropriate set of topics can be developed that is representative of the communications handled by the contact center.

Next, the topic modeling module selects one of the communications from the representative group in Operation 315 and creates one or more transcripts from the communication in Operation 320. For instance, the communication may be telephone call that was conducted between a customer service agent at a contact center and a remote party who called customer service. Here, the topic modeling module may use a speech-to-text engine to create one or more transcripts of the telephone call from the recording of the call.

Accordingly, in particular embodiments, the topic modeling module may be configured to create a transcript for each individual involved in the communication. For instance, if the communication is an audio communication such as a telephone call, then the topic modeling module may be configured to create a first transcript based on the audio of the agent speaking and a second transcript based on the audio of the remote party speaking. In addition, in the case of text-based communications such as Web chats and text messages, the topic modeling module may be configured to create a transcript of an exchange of chats and messages that occurred between the agent and remote party during the communication. For example, an agent may be exchanging text messages with a remote party that involves a back-and-forth exchange of messages, totaling twelve messages being sent during the entire exchange. Here, the topic modeling module may be configured to create a transcript that incorporates all twelve text messages instead of creating a transcript for each individual text message. Again, the topic modeling module may create a first transcript of all the agent's text messages sent during the exchange and a second transcript of all the remote party's text message sent during the exchange.

Once the text transcript(s) have been created for the communication, then the topic modeling module normalizes the transcript(s) in Operation 325. In particular embodiments, the topic modeling module performs this operation by invoking a normalize transcript module. As discussed further herein, the normalize transcript module normalizes a transcript by tokenizing the transcript, removing smaller words and stopwords from the transcript, and then lemmatizing or reducing the remaining words to their stems.

Once the transcript(s) has been normalized, the topic modeling module determines whether another communication is available in the representative group of communications in Operation 330. If so, then the topic modeling module returns to Operation 315 and selects the next communication from the representative group. However, if no more communications are remaining, then the topic modeling module remove certain words from the corpus in Operation 335. All the transcripts created from the representative group of communications may be referred to as the corpus.

For instance, in particular embodiments, the topic modeling module may be configured to remove any words that appear in less than a threshold number of documents (e.g., less than thirty percent of the documents). The reason behind filtering out such words is that such words are not thought to hold any discriminative power and even if they did have discriminative power, would form too small a clustering of documents to be useful. In addition, the topic modeling module may be configured to also remove any words that appear too frequently in the documents such as, for example, any words that appear in over sixty percent of the documents. The reason behind filtering out such words is so that such words do not overpower the rest of the corpus.

At this point, the topic modeling module converts the normalized transcripts to a matrix representation in Operation 340. A good practice to follow to run any mathematical model on the corpus is to convert the corpus into a matrix representation. In particular embodiments of the invention, the topic modeling module accomplishes this operation by using word embedding.

Word embedding involves converting texts into a numerical representation so that they can be processed by a computer. Generally speaking, most machine learning algorithms and deep learning architectures are incapable of processing strings or plain text in their raw form. Instead they require numbers as inputs to perform any type of sorting such as classification. Therefore, a word embedding format generally maps a word using a dictionary to a vector. For example, the sentence "the cow jumped over the moon" may be mapped to a vector by first defining a dictionary consisting of the unique words in the sentence. In this instance, the dictionary would be ["the," "cow," "jumped," "over," "moon"]. A vector representation of a word may then be a one-hot encoded vector in which the number one stands for the position where the word exists in the sentence and the number zero for everything else. Therefore, the vector representation for the word "jumped" would be [001000]. This only provides a simple example and other vector forms are typically used for word embedding such as frequency-based embeddings like count vector, term frequency-inverse document frequency ("TF-IDF") vectorization, and co-occurrence matrix with a fixed context window and prediction-based embeddings like continuous bag of words ("CBOW") and skip-gram model.

In various embodiments, the topic modeling module is configured to perform the frequency-based embedding method TF-IDF vectorization. This particular method of word embedding takes into account, not just the occurrence of a word in a single document, but in the entire corpus. The rationale behind TF-IDF vectorization is that common words tend to appear quite frequently in comparison to the words which are important to a document. For example, a document on the Tour de France is likely to contain more occurrences of the word "bicycle" in comparison to other documents. However, common words like "the" are also going to be present in higher frequency in almost every document. Therefore, ideally, we would want to down weight the common words occurring in almost every document and give more importance to words that appear in a subset of the documents. TF-IDF works by penalizing common words by assigning them lower weights and giving importance to other words found only in a subset of the documents.

The term frequency ("TF") represents the number of times a term appears in a document divided by the number of terms in the document. The TF denotes the contribution of a word to a document, i.e., relevant words in a document should be frequent. The inverse document frequency ("IDF") represents the log of the ratio equal to the number of documents divided by the number of documents a term appears in. The IDF represents the reasoning that if a word appears in all the documents, then that word is probably not relevant to any particular document. However, if the word appears in a subset of documents, then that word probably has some relevance to the documents it is present in.

For example, a corpus is made up of two documents. The first document has the terms with count: [This 1, is 1, about 2, cycling 4]. The second document has the terms with count: [This 1, is 2, about 1, running 1]. The TF-IDF for the word "This" in the first document is $(1/8)*\log(2/2)=0$. Likewise, the TF-IDF for the word "This" in the second document is $(1/5)*\log(2/2)=0$. However, the TF-IDF for the word "cycling" in the first document is $(4/8)*\log(2/1)=0.15$. Therefore, the TF-IDF method penalizes the word "This" but assigns greater weight to the word "cycling," demonstrating that the word "cycling" is an important word for the first document from the context of the entire corpus.

Once the topic modeling module has convert the transcripts into a matrix representation, the module sets a parameter for the number of topics to be identify in the corpus in Operation 345. Frequently when using LDA, the underlying topic structure of the corpus is unknown. However, the number of topics is a parameter that must be provided when performing LDA. Ideally, the number should be set to a value so that a sufficient number of topics are developed that adequately identify the different contexts found in the corpus. Thus, in particular embodiments, the number of topics is initially set at a particular number, e.g., five, and then a test is performed after training the model to evaluate the topic structure of the model.

Therefore, the topic modeling module trains the LDA on the matrix representation in Operation 350. As a result, a topic model is produced with five topics. Here, each topic is made up of a list of individual topic terms with weights. The number of topic terms is normally a set parameter. For example, the first topic may include the word set [0.035*govern+0.024*open+0.018*coast+0.017*Tasmanian+0.017*gold+0.014*Australia+0.013*beat+0.010*win+0.010*ahead+0.009*shark]. In this example, the word "govern" is weighted with the highest value, indicating the term is the most important term is identifying the topic.

At this point, in various embodiments, a statistical measure is made to evaluate the number of topics. Specifically, in particular embodiments, the topic modeling module calculates the perplexity of the model for the number of topics in Operation 355. Generally speaking, perplexity is a statistical measure of how well a probability model predicts a sample. The measurement is computed as a decreasing function of the log-likelihood of unseen documents. The lower the perplexity, the better the model. However, the statistic is generally meaningless on its own. The benefit of this statistic is seen in comparing perplexity across different models with varying the number of topics. The model with the lowest perplexity is generally considered the best.

Therefore, in various embodiments, the perplexity of the current topic model is compared with the perplexity of the previous topic model. Generally, one would expect the perplexity to drop as the number of topics is increased for the model. However, the decrease in perplexity tends to taper off at a certain point when the number of topics is increased. Thus, in particular embodiments, the optimal number of topics is determined when the difference in perplexity between two models is less than a defined threshold value.

Accordingly, returning to FIG. 3, the topic modeling module determines whether the difference in perplexity is less than the defined threshold in Operation 360. If the difference is not less than the threshold, then the topic modeling module returns to Operation 345 and adds one to the number of topics. The topic modeling module then repeats the operations for training the LDA on the matrix representation with the new number of topics and calculating the perplexity accordingly.

At some point, the number of topics is set to a value in which the difference in perplexity between the current topic model and the previous topic model is less than the threshold. At that point, the topic modeling module in various embodiments evaluates the topics and corresponding word sets. In addition, in particular embodiments, the topic modeling module determines one or more labels for each of the topics.

Therefore, the topic modeling module selects a first of the topics for the model in Operation 365. Generally speaking, the evaluation conducted in determining the number of topics that should make up the model is considered extrinsic is that it is used to demonstrate the effectiveness of the learned topics in the application domain (document collection). However, an evaluation of the topics themselves is also important in that such an evaluation can help to provide a qualitative understanding of the semantic nature of the topics. Thus, in various embodiments, the topic modeling module performs operations to evaluate the quality of a given topic in terms of the coherence, that is to say understandability and interpretability by humans, of the terms that make up a topic.

The topic modeling module begins the evaluation by calculating some type of coherence measure for the topic in Operation 370. Depending on the embodiment, one of several different measures can be used. In general, the various topic coherence measures take the set of terms (words) for a topic and sum a confirmation measure over all term pairs. Each term pair in a given topic is scored based on the component terms of the pair and some term-similarity measure. A combined score can then be produced for the topic based on the individual scores for the pairs by taking, for example, the arithmetic mean or median of the individual scores.

For example, one such coherence measure is based on pointwise mutual information ("PMI"). UCI coherence is calculated as:

$$Cuci = \frac{2}{N*(N-1)} \sum_{i=1}^{N-1} \sum_{j=i+1}^{N} PMI(wi, wj)$$

$$PMI(wi, wj) = \log \frac{P(wi, wj) + \epsilon}{P(wi) * P(wj)}$$

Probabilities are estimated based on term co-occurrence counts. Those counts are derived from documents that are constructed by a sliding window that moves over an external reference corpus such as, for example, Wikipedia. Each window position defines such a document. Therefore, if the topic is made of the terms [appliance, sale, kitchen, order], then UCI coherence is calculated:

$$Cuci = \frac{1}{6} * (PMI(\text{appliance, sale}) +$$

$$PMI(\text{appliance, kitchen}) + PMI(\text{appliance, order}) +$$

$$PMI(\text{sale, kitchen}) + PMI(\text{sale, order}) + PMI(\text{kitchen, order}))$$

While another such coherence measure is using an asymmetrical confirmation measure between top term pairs. The summation of UMass coherence accounts for the ordering among the top terms for a topic:

$$Cumass = \frac{2}{N*(N-1)} \sum_{i=2}^{N} \sum_{j=1}^{i-1} \log \frac{P(wi, wj) + \epsilon}{P(wj)}$$

The term probabilities are estimated based on document frequencies of the original documents used for learning the topic. Thus, looking at the example, the UMass coherence is calculated:

$$Cumass = \frac{1}{6} * (\log(P(\text{appliance} | \text{sale})) + \log(P(\text{appliance} | \text{kitchen})) +$$

$$\log(P(\text{appliance} | \text{order})) + \log(P(\text{sale} | \text{kitchen})) +$$

$$\log(P(\text{sale} | \text{order})) + \log(P(\text{kitchen} | \text{order})))$$

After determining the coherence measure for the topic, the topic modeling module determines whether the current measure is less than the previous measure for the topic in Operation 375. If the current coherence measure is the first such measure taken for the topic, then there is no previous measure. Accordingly, the topic modeling module eliminates one or more terms from the topic in Operation 380. Specifically, in particular embodiments, the topic modeling module eliminates one or more of the terms from the topic that are weighted the least of all the terms for the topic.

The topic modeling module then returns to Operation 370 and re-calculates the coherence measure based on the now-reduced number of terms for the topic. Accordingly, the topic modeling module continues to eliminate terms from the topic until the coherence measure stabilizes and the current measure is less than the previous measure (or the difference between the two measures is less than some threshold value). At that point, the terms of the topic should be quite understandable. Therefore, in various embodiments, the topic modeling module adds back the previously eliminated terms for the topic in Operation 385. (In some embodiments, the topic modeling module may not be configured to perform this operation or only perform this operation if the difference between the current measure and the previous measure is above a threshold value.)

Once the terms for the topic have been set based on the coherence measure, the topic modeling module in various embodiments labels the topic in Operation 390. The topic modeling module performs this operation so that the labels can be provided to users who are performing analytics on contact center communications. The labels enable these users to select topics of interest based on their search and the selected topics then allows the identification of the particular communications to perform the analytics on based on the communications being related to the selected topics.

Generally speaking, a good label for a topic should be understandable by users, capture the meaning of the topic, and distinguish the topic from the other topics in the model. In many instances, using a single term (word) for a label is typically too general and using a complete sentence is too specific. Therefore, the topic modeling module identifies a phrase to use as the label for the topic in various embodiments.

Here, in particular embodiments, the topic modeling module is configured to identify a phrase to use as a label based on the semantic distance between a candidate phrase and the topic by representing the semantics of a candidate phrase with a word distribution and casting the labeling exercise as an optimization exercise involving minimizing the Kullback-Leiber divergence between the term distribution found in the topic and the term distribution found in the candidate phrase.

The first task performed by the topic modeling module in identifying a label for a topic is identify a set of candidate labels. In particular embodiments, the topic modeling module performs this task by extracting the set of candidate labels from the collection of documents (corpus) used to train the topic model. Depending on the embodiment, the topic modeling module may perform this particular task using two basic approaches. The first approach is chunking (also known as shallow parsing), which is a technique in natural language processing that aims at identifying short phrases, or "chucks," in text. Here, the topic model module may be configured to use some type of natural language processing chunker that operates on text with part of speech tags, and uses the tags to make decisions of chunking according to some grammar, or through learning from labeled training sets. The advantage of using a natural language processing chunker is the phrases generated are grammatical and meaningful.

The second approach is to extract meaningful phrases from word ngrams based on statistical tests. The basic idea behind this approach is if the words in an ngram tend to co-occur with each other, then the ngram is more likely to be an n-word phrase. Depending on the embodiment, the topic modeling module may be configured to use any one of different manners to test whether an ngram is a meaningful phrase. Some such manners involve statistical measures such as mutual information, others involve using hypothesis testing techniques such as, for example, $X^2$ Test and Student's T-Test. The advantage of the ngram approach is that it does not require training data. However, the top ranked ngrams are sometimes not linguistically meaningful.

Once the candidate labels have been identified, the topic modeling module next scores the candidates based on semantic relevance. Depending on the embodiment, the topic modeling module may use any one of different scoring approaches such as zero-order relevance and first-order relevance. The idea behind these two approaches is a measure of the semantic relevance of a candidate label to a topic should compare the label with the corresponding multinomial distribution of the topic. The zero-order relevance score of a candidate phrase $l = u_0 \, u_1 \ldots u_m$ is:

$$\text{Score} = \log \frac{p(l|\theta)}{p(l)} = \sum_{0 \leq i \leq m} \log \frac{p(ui|\theta)}{p(ui)}$$

Where $\theta$ is the topic and the independence of $u_i$'s is assumed. The basic idea is a phrase containing more "important" (high $p(w|\theta)$) words in the topic distribution is assumed to be a good label. A candidate phrase is essentially scored using this approach based on the likelihood that the phrase is "generated" using the topic as opposed to some background word distribution. The approach is referred to as the "zero-order" relevance because no context information from the reference collection is considered.

The second approach involves providing a context to aid in "decoding" the meaning of the topic conveyed by a multinomial distribution. In this instance, the context is the original collection of documents (the corpus) from which the topic was extracted. Here, the candidate label is also represented with a multinomial distribution of words to compare with the topic's distribution to decide whether the label and the topic have the same meaning. The closeness of the two distributions can be measured using the Kullback-Leibler divergence. If a candidate label is a perfect label for the topic, then the two distributions should perfectly match each other and the divergence would be zero. However, the distribution for the candidate label is unknown. Therefore, an approximation of the distribution is needed. One way to approximate the distribution is to include a context collection, and estimate a distribution to substitute for the distribution for the candidate label. This context collection is referred to as the context for the label.

Therefore, the relevance scoring function of a candidate label with respect to a topic is defined as the negative Kullback-Leibler divergence of the two distributions. With the introduction of the context C, this scoring function can be written as:

$$\text{Score}(i,\theta) = \Sigma_w p(w|\theta) \text{PMI}(w,l|C) - D(\theta||C) + \text{Bias}(i,C)$$

Here the scoring function can be decomposed into three components. The second component is the Kullback-Leibler divergence between the topic and the labeling context. However, this divergence is identical for all candidate labels and therefore, can be ignored. The third component can be viewed as a bias of using context C to infer the semantic relevance between the label and the topic. However, since both the topics and the candidate labels are generated from the same collection, it is assumed there is no bias. Therefore, only the first component remains and can be re-written as the expectation of pointwise mutual information between the label and the terms in the topic given the context ($E_\theta$(PMI(w,l|C))). Accordingly, without any prior knowledge on the label-context bias, the candidate labels can be ranked using this function where PMI(w, l|C) can be pre-computed independently of the topic to be labeled. This relevance function is referred to as the first-order relevance of a label to a topic.

Once the candidate labels have been scored, the topic modeling module selects the applicable labels for the topic. Generally speaking, a single label is not typically selected for a topic in various embodiments because a single label usually only partially covers a topic. However, each selected label for a topic is expected to cover different aspects of the topic. Thus, the topic modeling module selects the labels in various embodiments with maximal marginal relevance ("MMR") criterion. MMR is commonly used in information retrieval tasks, where both high relevance and low redundancy of retrieval results are desired. Therefore, the topic modeling module selects the labels one by one, by maximizing the MMR criterion when selecting each label:

$$\hat{l} = \arg_{l \in L-S} \max[\lambda \text{Score}(l,\theta) - (1-\lambda) \max_{l \in S} \text{Sim}(l',l)]$$

Where S is the set of labels already selected, $$Sim(l', l) = -D(l'\|l) = -\sum_w p(w\,|\,l')\log\frac{p(w\,|\,l')}{p(w\,|\,l)},$$

and λ is a parameter to be empirically set.

Finally, achieving inter-topic discrimination may be another criterion to consider. A label with high relevance scores to many topics is typically not very useful. Therefore, a good label is consider to have high semantic relevance to the target topic and low relevance to the other topics. Therefore, in particular embodiments, the scoring function is modified to account for inter-topic discrimination. Here, the modified scoring function is:

$$\text{Score}'(i, \theta i) \approx \left(1 + \frac{\mu}{k-1}\right)E_{\theta_i}(PMI(w, l\,|\,C)) - \frac{\mu}{k-1}\sum_{j=1\ldots k}E_{\theta_j}(PMI(w, l\,|\,C))$$

Score'(i, θi) is used to rank the labels, which achieves discrimination across topics. At this point, the topic modeling module has generate one or more labels for the topic that are understandable, semantically relevant, discriminative across topics, and of high coverage within the topic.

Returning to FIG. 3, the topic modeling module determines whether another topic is available for the model in Operation 395. If so, the topic modeling module returns to Operation 365 and selects the next topic. The module then repeats the operations discussed above with respect to setting the terms for the newly selected topic based on a coherence measure and labeling the topic. Once terms for all of the topics have been selected and all the topics have been labeled, the process ends.

Normalize Transcript Module

Figure 4:
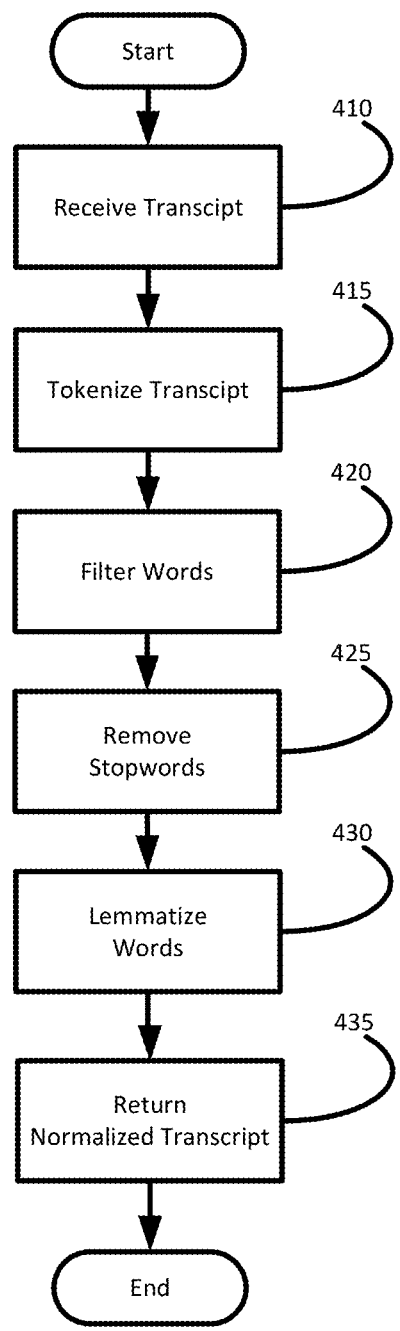
FIG. 4 illustrates a process flow for normalizing a transcript for a communication in accordance with various embodiments of the claimed invention.

Turning now to FIG. 4, additional details are provided regarding a process flow for normalizing a transcript for a communication in accordance with various embodiments of the invention. In particular, FIG. 4 is a flow diagram of a normalize transcript module for performing such functionality according to various embodiments of the invention. For example, the flow diagram shown in FIG. 4 may correspond to operations carried out by one or more processors in one or more components, such as the analytics component(s) 250 described above, as it executes the normalize transcript module stored in the component's volatile and/or nonvolatile memory.

As previously noted, the topic modeling module invokes the normalize transcript module in various embodiments. However, in other instances, the normalize transcript module may be invoked by another module and/or may be a stand-alone module that runs independently to normalize transcripts. However, whatever the case, the process begins with the normalize transcript module receiving the transcript in Operation 410. Here, depending on the embodiment, another module, such as the topic modeling module, may provide the normalize transcript module with the transcript or the normalize transcript module may retrieve the transcript from some type of storage media.

The normalize transcript module then tokenizes the transcript in Operation 415. Tokenization generally involves segmenting the text in the transcript into words and sentences. In many instances, since electronic text is a linear sequence of symbols, the text needs to be segmented into linguistic units such as words, punctuation, numbers, alphanumeric, etc. before any text processing can be done on the transcript. Accordingly, in various embodiments, the normalize transcript module preforms this operation by first segmenting the text into words (or tokens). Here, the normalize transcript module may be configured to look for some type of marker to identify words such as a blank space or punctuation to indicate the ending of one word and the beginning of a next.

In addition, the normalize transcript module may be configured to handle certain conditions that may exist within the transcript. For instance, although a period normally signals the end of a sentence, a period may also be found along with an abbreviation in a text. Another condition that may be encountered in a transcript is a hyphenated word. Depending on the circumstances, the hyphen may be a part of a token (e.g., forty-two) and sometimes it may not (e.g., Chicago-based). Other conditions that may be encountered include numerical and special expressions such as email addresses, dates and times, telephone numbers, etc.

Thus, in particular embodiments, an approach that may be used to handle these conditions is to maintain one or more lists of known abbreviations, hyphenated words, and formats for numerical and special expressions so that the normalize transcript module can refers to these list(s) when such a condition is encountered during tokenization. For instance, when the normalize transcript module encounters a word with a trailing period, the normalize transcript module can look up the word on a particular list and if found, the normalize transcript module can then tokenize the word and period as a single token. Otherwise, the normalize transcript module can tokenize the period as a separate token.

In addition, the normalize transcript module may be configured in particular embodiments to perform some type of normalization when a particular condition is encountered. For instance, a telephone may be formatted in a transcript as 123-456-7890 or (123) 456-7890 or (123)-456-7890. In this instance, the normalize transcript module may be configured to recognize a phone number has been encountered in the transcript and to normalize the phone number to a single format.

Once tokenization is completed, the normalize transcript module in various embodiments filter tokens (words) from the transcript in Operation 420. For instance, in particular embodiments, the normalize transcript module may be configured to remove any words that have less than a threshold number of characters (e.g., three characters). The reason behind filtering out such words is that, like low frequency words, such words are not thought to hold any discriminative power and even if they did have discriminative power, would form too small a clustering of documents to be useful.

Next, the normalize transcript module in various embodiments removes stopwords from the transcript in Operation 425. A stopword is defined as a term (word) that is not thought to convey any meaning as a dimension in a vector space. In other words, the term is not thought to convey context. Here, in particular embodiments, the normalize transcript module is configured to remove stopwords by comparing the terms in the transcript to a compilation of known stopwords. In other embodiments, the normalize transcript module may be configured to first tag the terms of the transcript with respect to what part of speech each term represents and then remove all tokens from the transcript that are not nouns, verbs, or adjectives.

At this point, the normalize transcript module lemmatizes the remaining terms in the transcript in Operation 430. Lemmatization is an algorithmic process for determining the lemma of a word based on its intended meaning. Thus, lemmatization takes into consideration the morphological analysis of a word. For example, the verb "to walk" in English may appear as "walk," "walked," "walks," and "walking." In this example, lemmatization would recognize the base form or lemma for each of these terms to be "walk." Therefore, the normalize transcript module references one or more dictionaries in various embodiments to look through to link a word form back to its lemma.

In other embodiments, the normalize transcript module may instead reduce the remaining terms in the transcript to their stems. Stemming involves cutting off the ending or the beginning of a word, taking into account a list of common prefixes and suffixes that can be found in inflected words. Stemming is typically easier to implement and faster than lemmatization. However, the indiscriminate cutting that occurs in stemming is not always successful. For example, performing stemming on the terms "studies" and "studying" would result in the stems "studi" and "study." This is because the suffix recognized for the term "studies" is "es" and the suffix recognized for the term "studying" is "ing." However, the lemma for both these terms is "study."

Finally, the normalize transcript module returns the normalized transcript in Operation 435. In particular embodiments, this operation may entail the normalize transcript module passing the normalized transcript back to another module, such as the topic modeling module, or may entail storing the normalized transcript in some type of storage media. Once the normalize transcript module has returned the normalized transcript, the process ends.

Assign Topics Module

Figure 5:
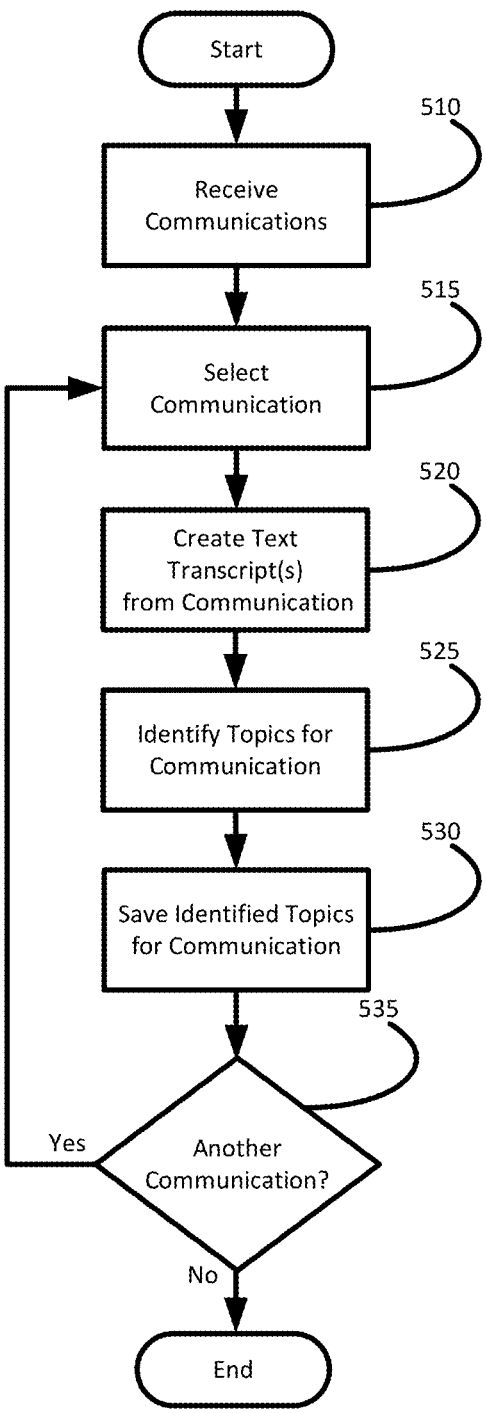
FIG. 5 illustrates a process flow for assigning topics to a communication in accordance with various embodiments of the claimed invention.

Turning now to FIG. 5, additional details are provided regarding a process flow for assigning topics to one or more communications in accordance with various embodiments of the invention. In particular, FIG. 5 is a flow diagram of an assign topics module for performing such functionality according to various embodiments of the invention. For example, the flow diagram shown in FIG. 5 may correspond to operations carried out by one or more processors in one or more components, such as the analytics component(s) 250 described above, as it executes the assign topics module stored in the component's volatile and/or nonvolatile memory.

In many instances, this particular process is performed on newly conducted communications for the contact center. For example, this particular process may be perform on the communications that took place during a workday at the conclusion of the workday.

Thus, the process begins with the assign topics module receiving one or more communications in Operation 510. Depending on the embodiment, the assign topics module may receive the communications in any one of various ways. For instance, in particular embodiments, the assign topics module may be invoked by some other module and/or component within the contact center that then provides the communications to the assign topics module. While in other embodiments, the assign topics module may be provided information on where the communications are stored so that the assign topics module can retrieve the communications. Those of ordinary skill in the art can envision other ways in which the assign topics module can receive the communications in light of this disclosure.

Next, the assign topics module selects one of the communications in Operation 515 and creates one or more text transcripts from the communication in Operation 520. In various embodiments, this particular operation may or may not be performed depending on the type of communication. For instance, if the communication is a recording of a telephone call that took place between an agent and a remote party, then the assign topics module would have some form of speak-to-text applied to the recording to create one or more text transcripts of the telephone call. However, if the communication is a transcript of the chat messages exchanged between an agent and a remote party during a chat, then the assign topics module may not perform the operation of creating one or more text transcripts of the chat since the chat messages for the chat are already in text form.

At this point, the assign topics module in various embodiments identifies the topics for the communication in Operation 525. In particular embodiments, the assign topics module performs this operation by invoking an identify topics module. In some instances, the assign topics module may invoke the identify topics module multiple times if the communication involves multiple transcripts. As detailed further herein, the identify topics module applies the developed topic model to the text transcript(s) of the communication to identify the applicable topics to the communication and returns the applicable topics to the assign topics module.

In turn, the assign topics module saves the identified topics for the communication in Operation 530. Once the topics have been saved for the communication, then the assign topics module determines whether another communication has been received to identify the topics for in Operation 535. If so, then the assign topics module returns to Operation 515 and selects the next communication. The assign topics module then performs the operation discussed above for the newly selected communication. Once the topics have been identified for all of the received communications, the process ends.

Identify Topics Module

Figure 6:
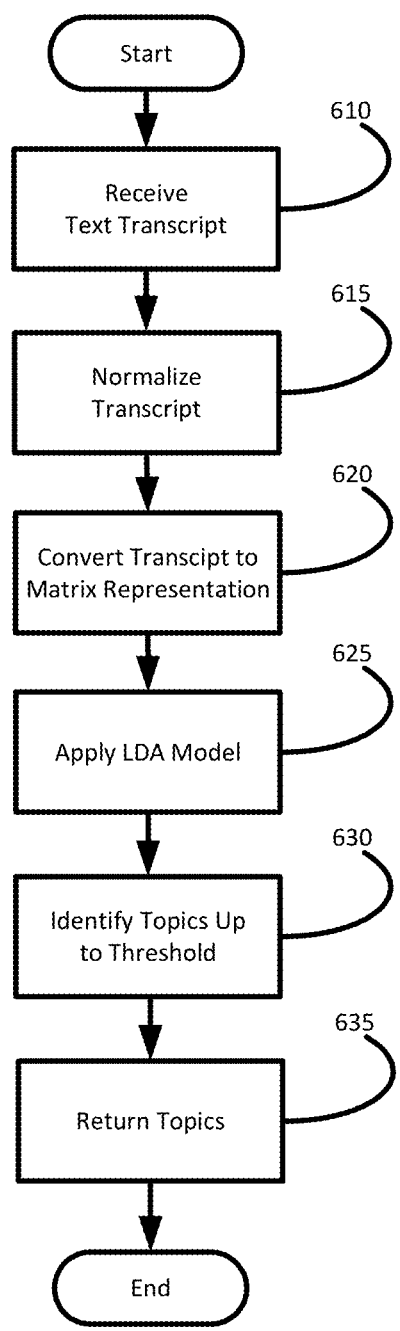
FIG. 6 illustrates a process flow for identify topics applicable to a communication in accordance with various embodiments of the claimed invention.

Turning now to FIG. 6, additional details are provided regarding a process flow for identify topics for a communication in accordance with various embodiments of the invention. In particular, FIG. 6 is a flow diagram of an identify topics module for performing such functionality according to various embodiments of the invention. For example, the flow diagram shown in FIG. 6 may correspond to operations carried out by one or more processors in one or more components, such as the analytics component(s) 250 described above, as it executes the identify topics module stored in the component's volatile and/or nonvolatile memory.

As previously noted, the assign topics module invokes the identify topics module in various embodiments. However, in other instances, the identify topics module may be invoked by another module and/or may be a stand-alone module that runs independently to identify topics for a transcript. However, whatever the case, the process begins with the identify topics module receiving the text transcript in Operation 610. Here, depending on the embodiment, another module such as the assign topics module may provide the identify topics module with the transcript or the identify topics module may retrieve the transcript from some type of storage media.

Once the transcript has been received, the identify topics module normalizes the transcript in Operation 615. Similar to the topic modeling module, the identify topics module performs this operation in particular embodiments by invoking the normalize transcript module previously discussed herein. Accordingly, the normalize transcript module normalizes the transcript by tokenizing the transcript, removing smaller words and stopwords from the transcript, and then lemmatizing or reducing the remaining words to their stems.

At this point, the identify topics module converts the normalized transcript to a matrix representation in Operation 620. That is to say, in particular embodiments, the identify topics module performs word embedding on the transcript to convert the text of the transcript into a numerical representation of the transcript. The identify topics module then applies the topic model to the matric representation of the transcript in Operation 625.

The result of applying the model to the matrix representation of the transcript can be interpreted as a distribution over the topics. For example, the result may be [(0, 0.020229582), (1, 0.48642197), (2, 0.020894188), (3, 0.020058075), (4, 0.022410348), (5, 0.025939714), (6, 0.20046122), (7, 0.13457063), (8, 0.048185956), (9, 0.02082831)]. In this example, the model is made up of ten topics (e.g., Topic 0 to 9) and topic 1 has the strongest representation in the text of 0.48642197. Further, since the model is based on LDA, the factors corresponding to each of the topics add up to one. LDA considers a document (in this case, the communication) as being generated by a mixture of topics. The purpose of LDA is to compute how much of the document was generated by which topic.

Therefore, in various embodiments, the identify topics module is configured to identify topics up to a threshold based on the factors assigned to the topics in Operation 630. Generally speaking, the identify topics module performs this operation by first considering the topic having the strongest representation in the text and working towards the topic having the weakest representation in the text in light of the threshold.

For instance, the threshold may be set as a particular value or at a summation of a particular value. For example, the threshold may be set at a value of 0.10. Here, the identify topics module would identify topics 1, 6, and 7 (from the example above) since these topics are associated with the factors (0.48642197, 0.20046122, and 0.13457063, respectfully) that are greater than 0.10. While in another example, the threshold may be set at a summation of 0.50. Therefore, in this example, the identify topics module would identify topics 1 and 6 since these two topics are the two most representative of the communication and their factors sum to an amount (0.68688319) greater than 0.50.

Once the identify topics module has identified the topics for the communication, then the module returns the topics in Operation 635. Depending on the embodiment, this operation may entail the identify topics module passing the identified topics back to another module, such as the assign topics module, or may entail storing the identified topics in some type of storage media. At this point the process ends.

As discussed further herein, once the topics have been identified for the communication, they are then used in determining whether the communication is applicable to a particular search being performed by an individual for communications to perform analytics on. As is further detailed herein, the individual identifies one or more search terms that are then matched to one or more topics. The individual reviews the matched topics and selects one or more of the topics that are applicable to his or her particular search. In turn, these selected topics are then used to identify the applicable communications for the individual to perform analytics on.

Display Search Terms GUI Module

Figure 7:
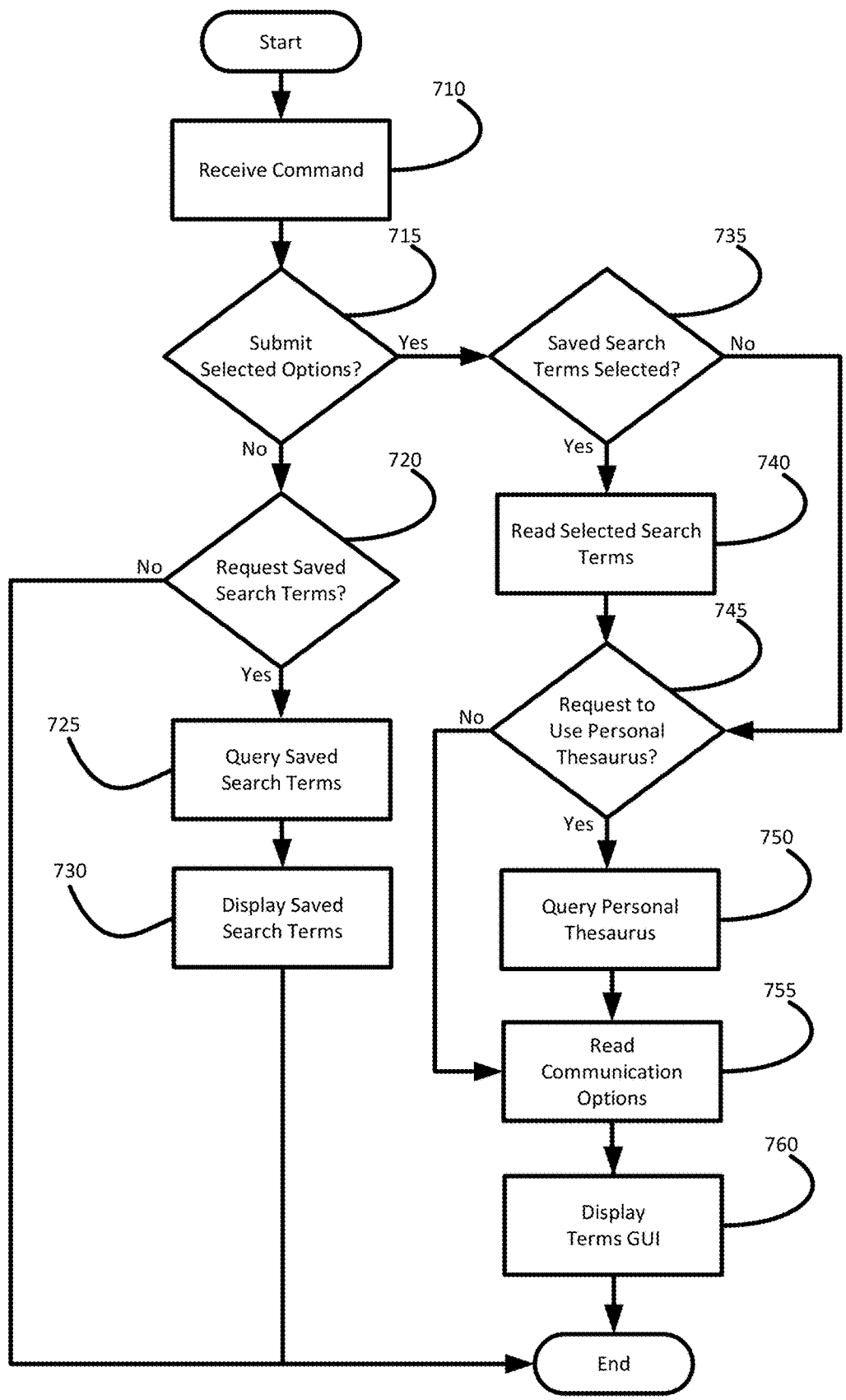
FIG. 7 illustrates a process flow for displaying a search terms graphic user interface ("GUI") in accordance with various embodiments of the claimed invention.

Turning now to FIG. 7, additional details are provided regarding a process flow for displaying a search terms GUI in accordance with various embodiments of the invention. In particular, FIG. 7 is a flow diagram of a display search terms GUI module for performing such functionality according to various embodiments of the invention. For example, the flow diagram shown in FIG. 7 may correspond to operations carried out by one or more processors in one or more components, such as the administrator's workstation 280 described above, as it executes the display search terms GUI module stored in the component's volatile and/or nonvolatile memory.

It is noted that the individual who is performing a search and analytics of communications in the example provided herein is a contact center administrator. However, one should understand that the individual can be other persons besides an administrator and therefore, the administrator should not be viewed as limiting those who can practice aspects of the invention, as well as the scope of the invention.

The administrator logs into his or her workstation 280 to conduct analytics on a group of communications and opens a software application on his or her workstation 280 to use in conducting the analytics. In particular embodiments, a GUI is provided to the administrator that allows the administrator to select one or more options to aid him or her in identifying communications to conduct analytics on. For instance, the GUI may provide an option for the administrator to review and select a saved search that the administrator (or other user) had previously saved. In addition, the GUI may provide an option for the administrator to indicate that he or she would like to use a personal thesaurus that he or she (or other user) has constructed that is then used in identifying search terms. Further, the GUI may provide an option for the administrator to identify what type of communications that he or she would like to conduct analytics on.

Therefore, turning now to FIG. 7, the process begins with the display search terms GUI module receiving a command in Operation 710. The command being some type of operation performed by the administrator on the GUI. Accordingly, the display search terms GUI determines in Operation 715 whether the command indicates the administrator has selected the submit selected options button on the GUI indicating the administrator would like to go to the GUI for the search terms.

If display search terms GUI module determines the administrator has not selected the submit selected options button, then the module determines whether the administrator has selected the option to request for terms previously saved by the administrator or another user in Operation 720. If so, then the display search terms GUI module queries the saved search terms for the identified individual (e.g., the administrator) in Operation 725 and displays the saved search terms in Operation 730. Depending on the embodiment, the saved search terms may be displayed on the current GUI in a variety of ways. For instance, in particular embodiments, a listing of saved search terms may be displayed on the current GUI so that the administrator can select from the saved search terms. A title for each of the saved search terms may be provided along with a mechanism to allow the administrator to select the desired saved search terms.

Returning to Operation 715, if the display search terms GUI module determines instead that the commend indicates the administrator has selected the submit selected options button on the GUI, then the module determines whether the administrator has selected any saved search terms in Operation 735. If so, then the display search terms GUI module reads the selected search terms from the current GUI in Operation 740. In particular embodiments, this operation entails the display search terms GUI module to read the title of the saved search terms selected by the administrator from the GUI and then read the actual search terms that were saved corresponding to the selected terms.

Next, the display search terms GUI module determines whether the administrator has indicated that he or she would like a personal thesaurus to be applied to the search in Operation 745. As is further discussed herein, various embodiments of the invention allow a user (e.g., the administrator) to construct a personal thesaurus that may be used in identifying specific search terms. For example, the administrator may have constructed a personal thesaurus indicating that he or she wants the term "farewell" associated with the term "adieu" so that whenever he or she enters the search term "farewell," the search term "adieu" is also included in the search. Therefore, if the display search terms GUI module determines the administrator has indicated that he or she would like a personal thesaurus to be applied to the search, the module queries the personal thesaurus in Operation 750.

At this point, the display search terms GUI module reads the communication options in Operation 755. In various embodiments, the communication options indicate what types (channels) of communications are to be searched and analyzed. For example, the administrator may be interested in conducting speech analytics on a group of telephone calls to identify and review incidents in the calls where a remote party on the called placed an order for a particular product. Therefore, the administrator would indicate (select the option for) telephone calls on the current GUI as the communication type involved in the search and analytics and the display search terms GUI module would read the administrator's selection from the GUI.

Finally, the display search terms GUI module displays the search terms GUI to the administrator in Operation 760. As is further discussed herein, in various embodiments, the search terms GUI enables the administrator (the user) to identify the search terms to be used in conducting the analytics on the selected type of communications. Such identification may involve the administrator electing one or more synonyms for a particular search term to include in the search terms entered by the administrator. In addition, such identification may involve the administrator assigning a definition to a particular search term entered by the administrator that may have multiple meanings. Further, such identification may involve the administrator selecting one or more topics identified for the search terms that are then used to query the communications to be used in conducting the analytics. Accordingly, in various embodiments, the selected topics help to filter/narrow down the communications to conduct the analytics on based on the search terms entered and/or selected by the administrator.

Identify Communications Module

Figure 8:
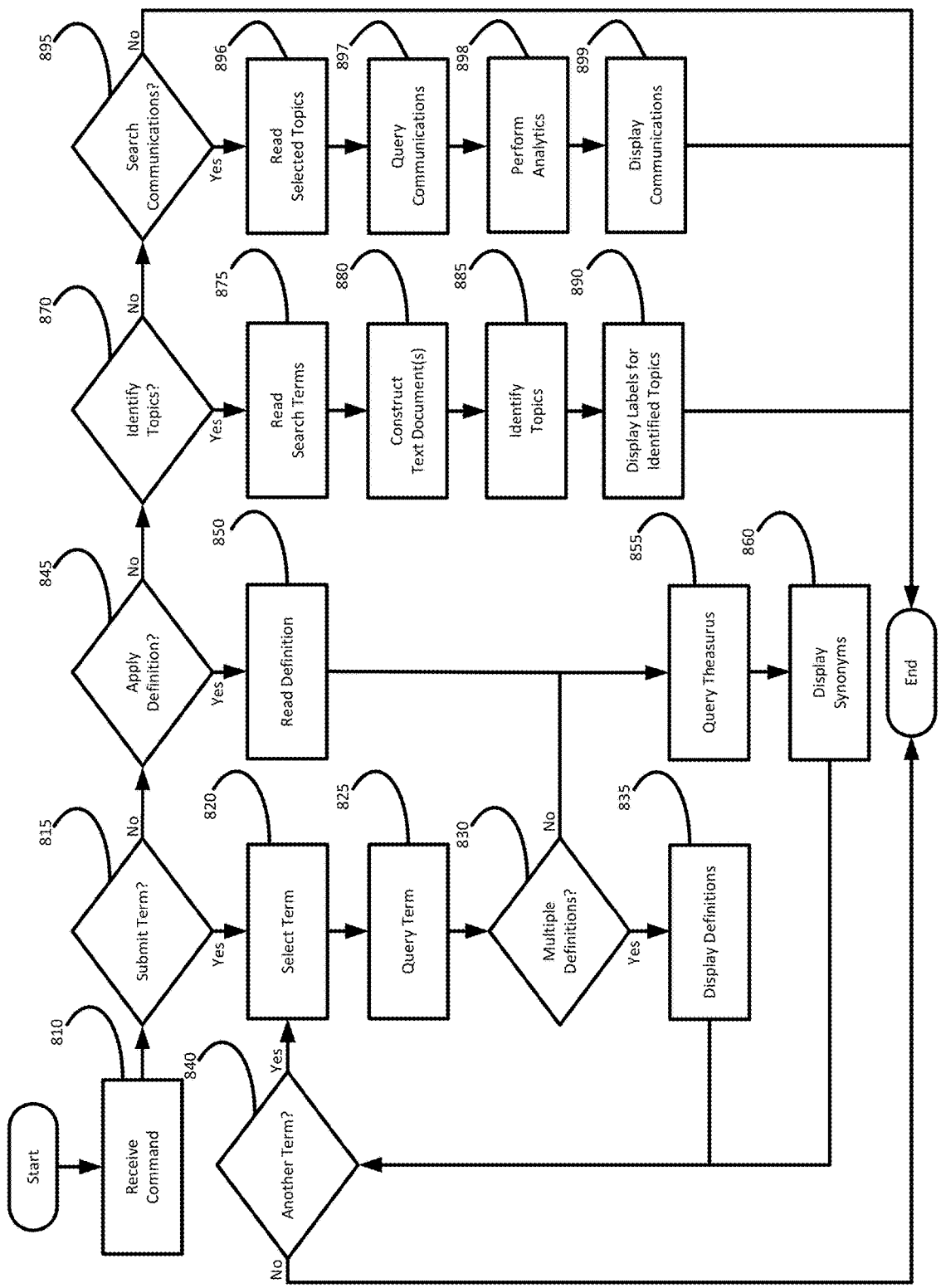
FIG. 8 illustrates a process flow for identifying communications related to selected topics in accordance with various embodiments of the claimed invention.

Turning now to FIG. 8, additional details are provided regarding a process flow for identifying communications based on one or more selected topics in accordance with various embodiments of the invention. In particular, FIG. 8 is a flow diagram of an identify communications module for performing such functionality according to various embodiments of the invention. For example, the flow diagram shown in FIG. 8 may correspond to operations carried out by one or more processors in one or more components, such as the administrator's workstation 280 described above, as it executes the identify communications module stored in the component's volatile and/or nonvolatile memory.

The process begins with the identify communications module receiving a command in Operation 810. The command being some type of operation performed by the administrator on the GUI. Therefore, the identify communication module determines whether the command from the administrator is to submit entered search terms in Operation 815. Here, the administrator may be provided with a field to enter one or more terms to search for in the applicable communications. Upon entering the terms, the administrator selects a submit button in particular embodiments and the identify communications module receives the command.

Therefore, if the identify communications module determines the command is to submit search terms, then the module selects one of the terms in Operation 820. Upon selecting the term, the identify communications module queries the term in Operation 825 from one or more dictionaries for definitions for the term. Accordingly, the identify communications module determines whether the term has multiple definitions in Operation 830. If so, then the identify communications module displays the definitions on the GUI to the administrator in Operation 835 so that the administrator can select the appropriate definition for the term.

For example, the administrator may have entered the search term "drill." Here, the identify communications module queries the one or more dictionaries for "drill" and four definitions are returned from the query. The definitions include: (1) practice, exercise (n); (2) tool for boring (n); (3) train, discipline (v); and (4) to bore a hole (v). Therefore, the identify communications module determines the term has multiple definitions and displays the four definitions for the term to the administrator so that he or she can select the appropriate definition for the term and search.

If instead the identify communications module determines the term does not have multiple definitions, then the module queries one or more thesauruses for the term in Operation 855. In some instances, the administrator may have identified a personal thesaurus to use and the identify communications module may then query the personal thesaurus in addition to or instead of a standard thesaurus. Here, the identify communications module is attempting to identify synonyms for the search terms. That is to say, the identify communications module is attempting to identify words and/or phrases that mean exactly or nearly the same as the search term. If synonyms are identified, then the identify communications module displays the synonyms to the administrator on the GUI in Operation 860.

At this point, the identify communications module determines whether the administrator has entered another search term in Operation 840. If so, then the identify communications module returns to Operation 820 and selects the next search term. The identify communications module then repeats the operations just discussed for the newly selected search term.

Returning to Operation 815, if the identify communications module determines the command is not related to the administrator submitting search terms, then the module determines whether the command is related to the administrator selecting the appropriate definition for a search term in Operation 845. For instance, returning to the example, the administrator may have entered the search term "drill" because he or she is interested in conducting analytics on communications in which remote parties had contacted the contact center's technical support group because the parties were having trouble with a drill they has recently purchased. Therefore, the administrator would select the second definition displayed for "drill," that being "tool for boring," and select an "Apply" button on the GUI to apply this particular definition to the term "drill." In turn, the identify communications module would have determined the command is related to the administrator selecting the appropriate definition for a search term and accordingly, read the selected definition in Operation 850. At that point, the identify communications module would query the applicable thesauruses to attempt to identify synonyms for the search term and corresponding definition.

Returning to Operation 845, if the identify communications module determines the command is not related to the administrator selecting the appropriate definition for a search term, then the identify communications module determines whether the command is related to the administrator selecting an option on the GUI to identify topics related to the search terms in Operation 870. More specifically, the identify communications module determines whether the command is related to identifying the topics from the topic model that are related to the search terms.

If so, then the identify communications module reads the search terms in Operation 875. As previously noted, in various embodiments, the administrator is provided with synonyms for each of the search terms that he or she as entered. The administrator is then provided the option to select any one or more of these identified synonyms as additional search terms that are used along with the search terms he or she has manually entered. For example, the administrator may have entered the search term "big" and the identify communication module may have identify the synonyms "large" and "huge" and displayed the two synonyms to the administrator. In turn, the administrator may have selected the two synonyms on the GUI, identifying these two synonyms as additional search terms to include along with the term "big." The same scenario may have occurred for a second search term the administrator entered, that being "item." Here, the identify communication module may have identify the synonym "thing" that the administrator selected as an additional search term to include along with the term "item."

Accordingly, the identify communications module constructs one or more text documents out of the search terms in Operation 880. For instance, in particular embodiments, the identify communications module is configured to construct one or more text documents out of the search terms by creating combinations of the search terms based on the synonyms selected for the individual search terms entered by the administer and creating a text document for each combination of search terms. For instance, returning to the example in which the administrator has entered the search terms "big" and "item," and has selected the synonyms "large," "huge," and "thing." Here, the identify communications module reads the search terms as ["big," "huge," "large"]+["item," "thing"] and constructs a first text document as "big item," a second text document as "big thing," a third text document as "huge item," a fourth text document as "huge thing," a five text document as "large item," and a sixth text document as "large thing."

While in other embodiments, the identify communications module may be configured to only use the search terms manually entered by the administrator in constructing the one or more text documents. Thus, in the example, the identify communications module constructs a single text document "big item." In these particular embodiments, the additional search terms identified as synonyms are used in searching for the terms in the applicable communications.

Once each of the one or more text documents have been normalized, then the identify communications module identifies the topics related to the search terms in Operation 885. Specifically, in particular embodiments, the identify communications module performs this operation by invoking the identify topics module for each of the text documents. As already detailed herein, the identify topics module applies the developed topic model to each of the text documents constructed from the search terms to identify the applicable topics to the search terms and returns the applicable topics to the identify communications module.

In turn, the identify communications module displays the labels for the identified topics to the administrator in Operation 890. Depending on the embodiment, the identified topics may be displayed on the current GUI to the administrator or another GUI may be provided to the administrator to display the topics. As a result, the administrator looks through the identified topics and selects those topics he or she believes applies to the analytics he or she is performing.

Returning now to Operation 870, the identify communications module may determine the command is not related to identifying topics for the search terms. Therefore, in these instances, the identify communications module determines whether the command is related to search communications to identify those communications associated with the topics selected by the administrator in Operation 895. If so, then the identify communications module reads the selected topics from the GUI in Operation 896.

Next, the identify communications module queries the pool of communications to identify which of the communications are associated with the selected topics in Operation 897. As the reader may recall, the administrator may have identified the type (channel) of communications that are to be considered for performing the analytics. For instance, the administrator may have identified that he or she only wants to perform analytics on telephone calls. In addition, in particular embodiments, the administrator may also identify dates in which the communications occurred. For instance, in the example, the administrator may have indicated telephone calls that occurred between Jan. 1, 2014 and Sep. 30, 2018.

Once the identify communications module has identify the applicable communications from the query, the module then performs analytics on the communications based on the search terms identified by the administrator in Operation 898. In particular embodiments, the identify communications module performs this operation by invoking a perform analytics module. As discussed further herein, the perform analytics module performs the applicable analytics on the communications based on the search terms identified by the administrator. Accordingly the type of analytics performed on the communications may vary based on the type of communications being analyzed. For instance, if the communications are telephone calls, then speech analytics may be performed on the communications to identify occurrences of the search terms. However, if the communications are Web chats or text messages, then text analytics may be performed on the communications.

Once the analytics has been performed on the applicable communications, the identify communications module displays the communications to the administrator in Operation 899. Again, depending on the embodiments, the identify communications module may display the communications on the current GUI or may open a new GUI for the administrator to display the communications. Additional information may be provided along with the communications such as what topics are applicable to each of the communications and/or what search terms were identified in each of the communications. At this point, the administrator can now review individual communications and listen and/or view the exchange that took place between the agent and remote party.

Perform Analytics Module

Figure 9:
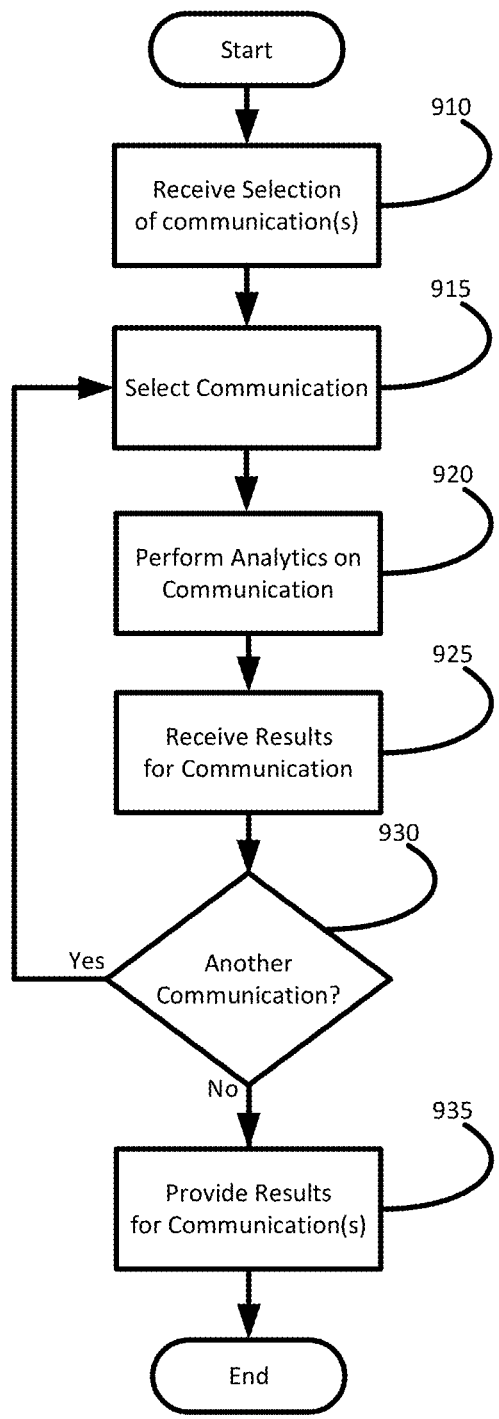
FIG. 9 illustrates a process flow for performing analytics on one or more communications in accordance with various embodiments of the claimed invention.

Turning now to FIG. 9, additional details are provided regarding a process flow for performing analytics on one or more communications in accordance with various embodiments of the invention. In particular, FIG. 9 is a flow diagram of a perform analytics module for performing such functionality according to various embodiments of the invention. For example, the flow diagram shown in FIG. 9 may correspond to operations carried out by one or more processors in one or more components, such as the administrator's workstation 280 described above, as it executes the perform analytics module stored in the component's volatile and/or nonvolatile memory.

As previously noted, the identify communications module invokes the perform analytics module in various embodiments. However, in other instances, the perform analytics module may be invoked by another module and/or may be a stand-alone module that runs independently to analyze communications. However, whatever the case, the process begins with the perform analytics module receiving the one or more communications in Operation 910. Here, depending on the embodiment, another module, such as the identify communications module, may provide the perform analytics module with the communications or the perform analytics module may retrieve the communications from some type of storage media.

In addition, the perform analytics module may be provided with the search terms to be used to conduct the analytics on the communications. Again, another module may provide the perform analytics module with the search terms or the perform analytics module may retrieve the search terms from some type of storage media.

The perform analytics module selects one of the communications in Operation 915 and performs analytics on the communication in Operation 920. As previously mentioned, the type of analytics performed on the communication may vary depending on the type of communication being analyzed. For instance, speech analytics may be performed on telephone calls while text analytics may be performed on Web chats and text messages.

Generally speaking, the perform analytics module performs the analytics in various embodiments by making use of an analytics engine. The perform analytics module provides the communication and search terms to the analytics engine and the engine performs the analytics on the communication accordingly. For instance, looking again at the example involving the search terms ["big," "huge," "large"]+["item," "thing"], the perform analytics module may instruct a speech analytics engine to search the applicable telephone call to identify instances in the call when either the agent or remote party on the call said "big item," "big thing," "huge item," "huge thing," "large item," and "large thing." Once the analytics engine has completed performing analytics on the communication, then the perform analytics module receives the results for the communication in Operation 925. Here, the results indicate whether and/or where in the communication the search terms were located.

At this point, the perform analytics module determines whether it has received another communication for analysis in Operation 930. If so, then the perform analytics module returns to Operation 915 and selects the next communication. The perform analytics module then repeats the operations discussed above in performing analytics on the newly selected communication.

If instead the perform analytics module determines there are no further communications to analyze, then the perform analytics module returns the results for the communications in Operation 935. For instance, depending on the embodiment, this operation may entail the perform analytics module providing the results to another module, such as the identify communications module, or storing the results in some type of storage media. Once the results have been provided, the process ends.

Example GUIs

An example is now provided that is used in the remainder of this disclosure to demonstrate various aspects of embodiments of GUIs that may be provided in accordance with embodiments of the invention. This example is provided to help facilitate the reader's comprehension of these aspects and should not be viewed as limiting the scope of the invention.

In the example, an administrator at a contact center is interested in reviewing telephone calls in which each caller phoned into the contact center's customer service to purchase a new handle for his or her refrigerator. The administrator wants to review such calls because he or she wants to review the process used by the agents who fielded the calls in determining the right handle for the callers' refrigerators. In many instances, callers have had to return handles because they did not fit the callers' refrigerators. Therefore, a problem appears to exist in the process used by agents to determine the correct handle to ship to callers.

Figure 10:
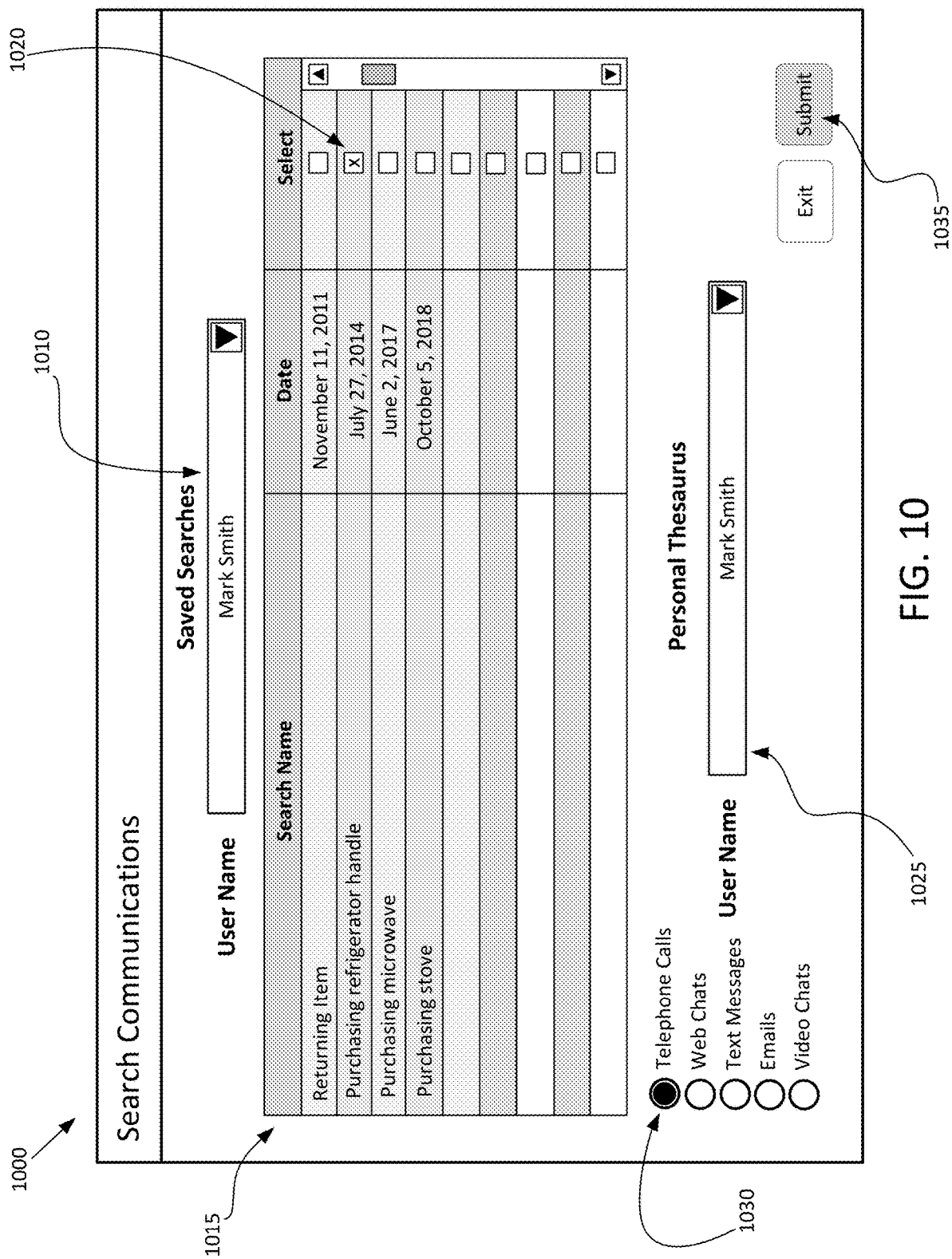
FIG. 10 illustrates a GUI used in accordance with various embodiments of the claimed invention.

Accordingly, the administrator logs into his or her workstation 280 and starts the program for searching communications (conducting analytics). As a result, a first GUI is provided on the administrator's workstation such as the GUI 1000 shown in FIG. 10. FIG. 10 provides an embodiment of a GUI 1000 that allows the administrator to select options for conducting the search. Here, the administrator is provided with a dropdown 1010 that allows him or her to retrieve saved searches for a particular individual. In this case, the administrator has selected to retrieve Mark Smith's (this may or may not be the administrator's name) saved searches. Therefore, a list 1015 of saved searches for Mark Smith are provided on the GUI 1000 and the administrator has selected 1020 Mark Smith's saved search named "Purchasing refrigerator handle."

In addition, the GUI 1000 provides a dropdown 1025 that allows the administrator to select an individual's personal thesaurus to use during the search. In this case, the administrator has selected to also use Mark Smith's personal thesaurus. Further, the GUI 1000 includes radio buttons that allow the administrator to select what types (channels) of communications the administrator would like to conduct the search on. Here, the administrator has selected the radio button 1030 for telephone calls. Finally, once the administrator has selected all the options he or she wishes to use to conduct the search, the administrator selects the "Submit" button 1035 located at the right bottom of the GUI 1000.

Figure 11:
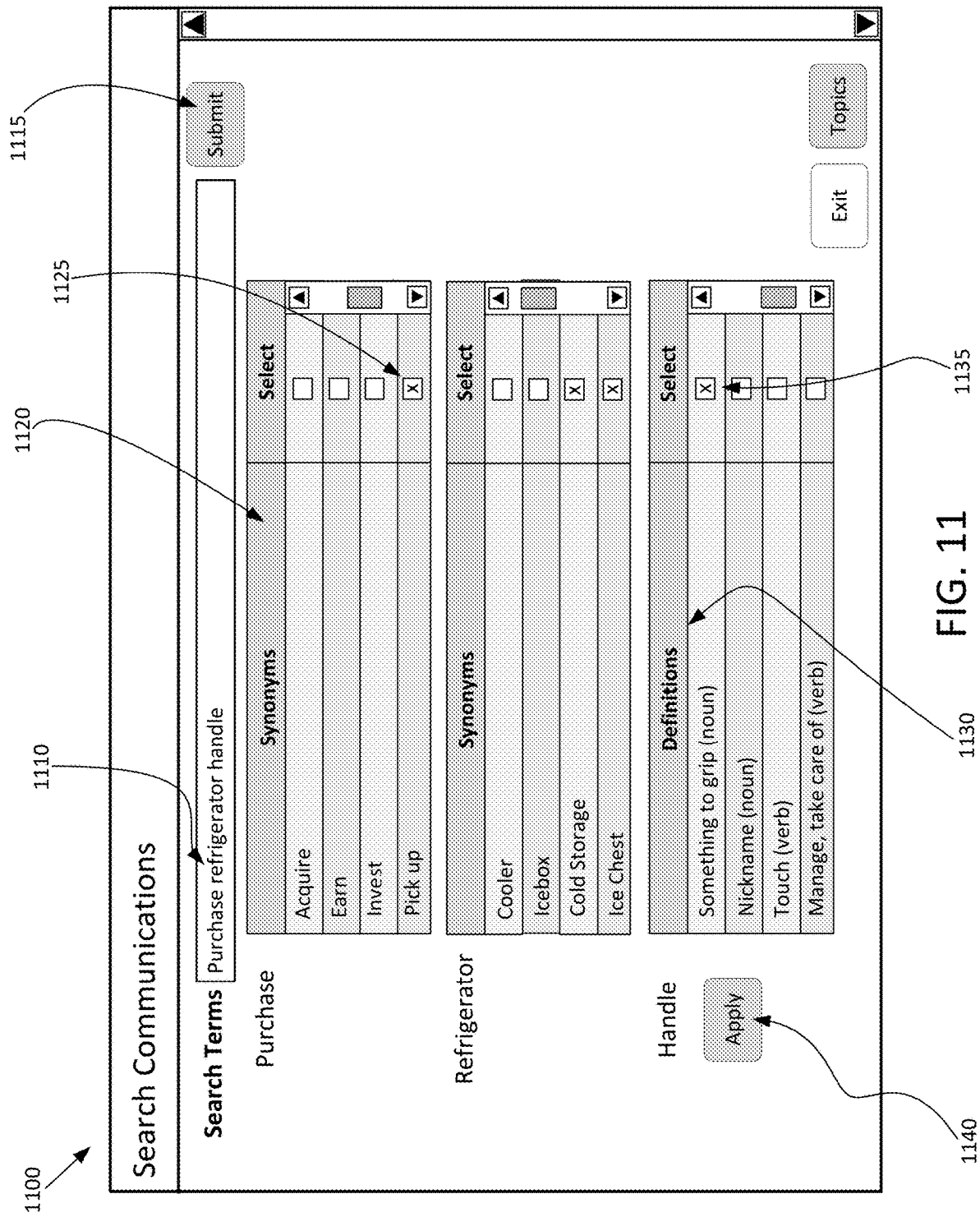
FIG. 11 illustrates a second GUI used in accordance with various embodiments of the claimed invention.

In response, the GUI 1100 shown in FIG. 11 is provided on the administrator's workstation 280. FIG. 11 provides an embodiment of a second GUI 1100 that allows the administrator to provide search terms, as wells as select applicable synonyms for the search terms. Here, the GUI 1100 provides a freeform field 1110 that allows the administrator to type in the search terms, in this case "Purchase refrigerator handle." Note that in this instance, these particular search terms were automatically populated in the field 1110 as a result of the administrator selecting one of Mark Smith's saved searches on the previous GUI 1000.

The administrator selects the "Submit" button 1115 after entering the search terms and as a result, the administrator is provided with synonyms or definitions for each of the search terms. Here, for instance, the GUI 1100 lists the synonyms "Acquire, Earn, Invest, Pick up" 1120 for the search term "Purchase" and the administrator has selected the synonym "Pick up" 1125 to indicate that he or she would like to include this synonym in the search terms. In addition, the GUI 1100 provides definitions 1130 for the term "Handle" and the administrator has selected the definition "Something to grip (noun)" 1135 as the appropriate meaning to be used for the search term.

Figure 12:
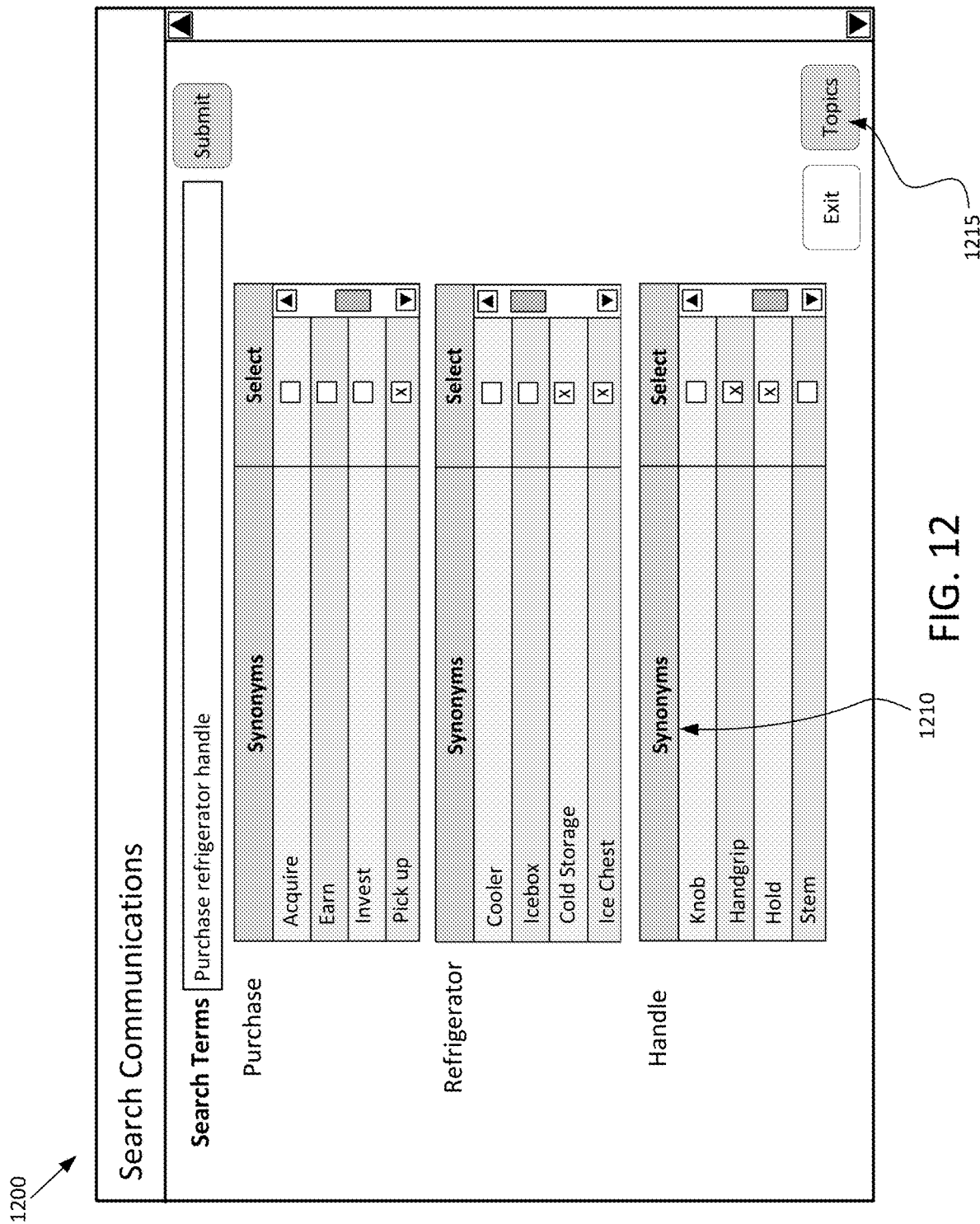
FIG. 12 further illustrates the second GUI in accordance with various embodiments of the claimed invention.

The administrator then selects the "Apply" button 1140 on the GUI 1100 to apply the selected definition 1135 and the GUI 1100 is updated accordingly. Thus, turning to FIG. 12, the GUI 1100 is updated to now list synonyms 1210 for the search term "Handle" based on the definition selected for the search term. Once the administrator has identified all of the synonyms he or she would like added to the search terms, the administrator then selects the "Topics" button 1215 to identify the topics related to the search terms.

Figure 13:
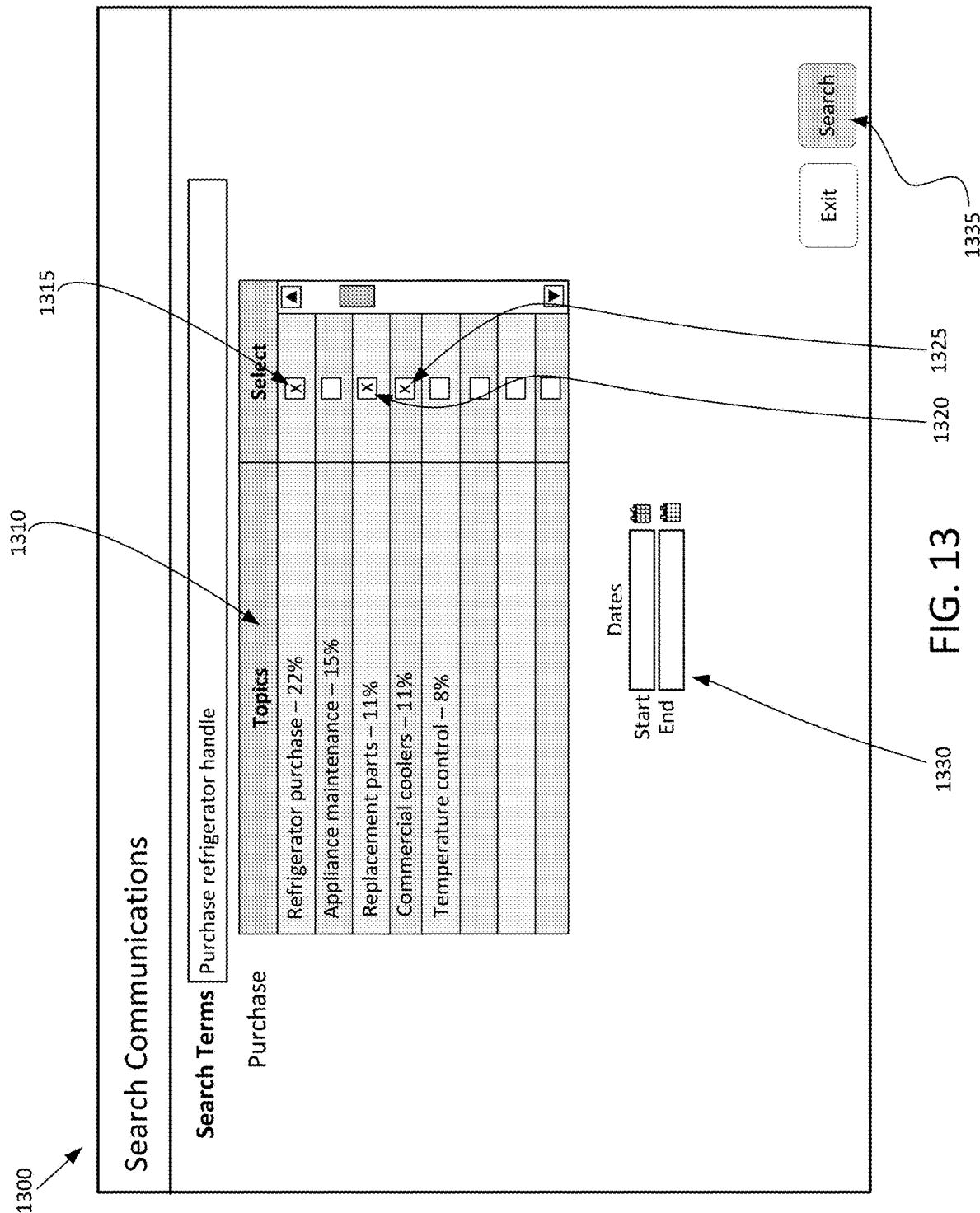
FIG. 13 illustrates a third GUI used in accordance with various embodiments of the claimed invention.

FIG. 13 provides an embodiment of a GUI 1300 providing a list of the topics 1310 related to the search terms entered and selected by the administrator. Five different topics have been identified based on the search terms. In this instance, the administrator has selected three of the topics, "Refrigerator purchase—22%" 1315, "Replacement parts—11%" 1320, and "Commercial coolers—11%" 1325. The percentage provided with each topic identifies the factor assigned to the topic based on applying the topic model to the search terms as previously discussed.

In addition, the GUI 1300 provides two date fields 1330 that the administrator can use to identify a date range to search for the applicable communications for the selected topics. Once the administrator has selected the desired topics and identified the applicable date range, the administrator can select the "Search" button 1335 so that the search for the applicable communications can be made and the analytics can be performed on the located communications based on the search terms.

Turning now to FIG. 14, an embodiment of a GUI 1400 is provided showing the results of the search and analytics that have been performed based on the search terms. Here, the GUI 1400 provides a list of communications (telephone calls) 1410 that have been identified and contain instances in which an agent and/or party spoke the search terms (including the selected synonyms). A recording ID, the name of the agent on the call, a date and time the call took place, and the applicable topic are provided for each of the telephone calls.

In addition, the GUI 1400 provides the administrator with fields 1415, 1420, 1425 to filter the list of records based on a topic, agent, and/or date range. The administrator can select information for one or more of the fields 1415 1420, 1425 and select the "Apply Filters" button 1430 on the GUI 1400 to have the list of communications filters based on the selected information. Further, the GUI 1400 provides a checkbox 1435 for each of the communications in the list that allows the administrator to select communications he or she would like to review. Once the administrator has selected which of the communications he or she would like to review, the administrator can then select the "Review" button 1440 to review each of the individually selected communications.

Figure 15:
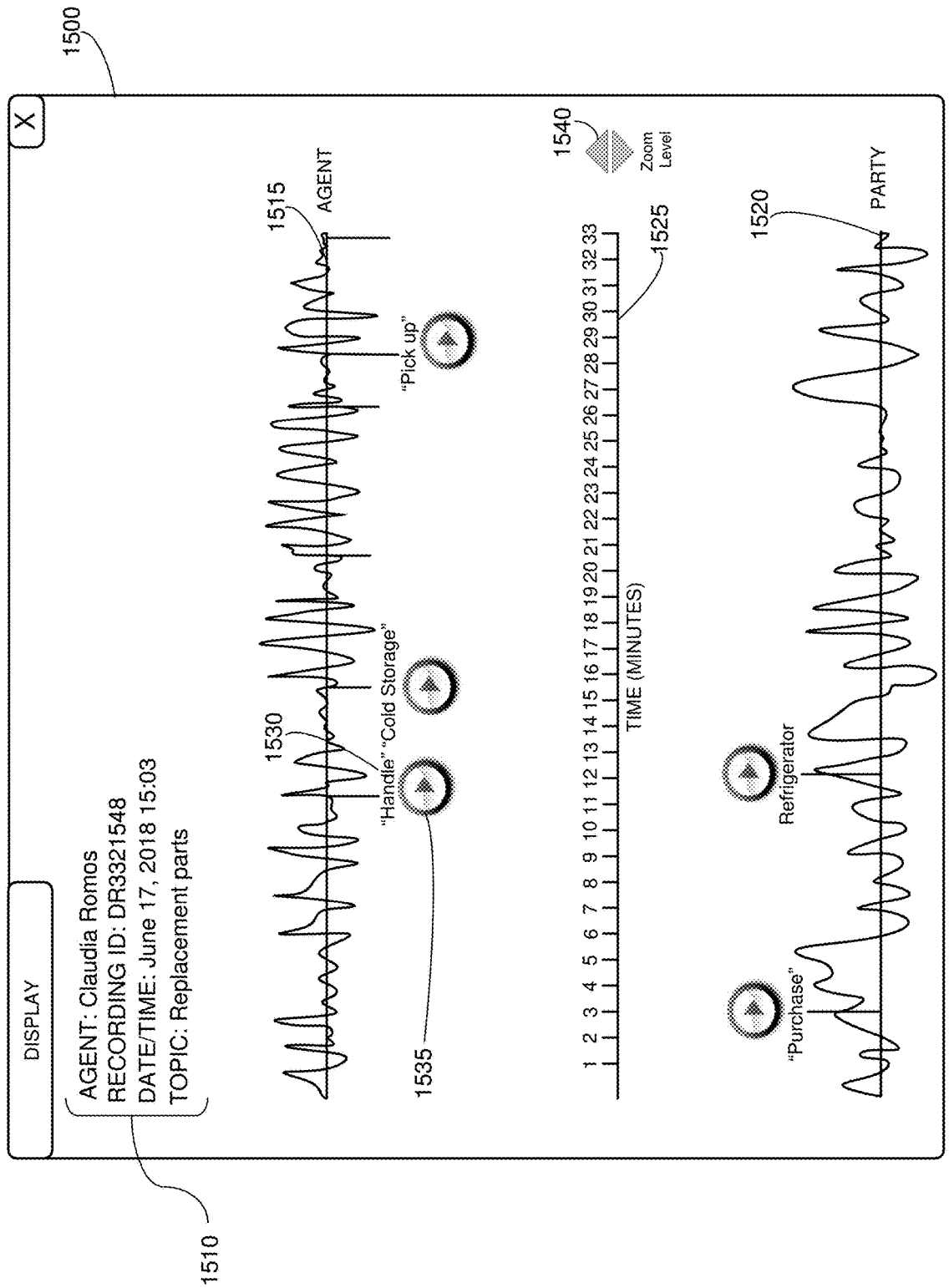
FIG. 15 illustrates a fifth GUI used in accordance with various embodiments of the claimed invention.

Therefore, turning to FIG. 15, an embodiment of a GUI 1500 is provided that can be used by the administrator in reviewing one of the selected communications, in this instance one of the selected telephone calls. The GUI 1500 provides information 1510 on the particular communication at the top. Here, the communication (telephone call) was handled by Claudia Romos on Jun. 17, 2018 at 15:03 and the related topic for the communication is "Replacement parts."

In addition, the GUI 1500 provides a representation 1515 of the agent's speech component, e.g., the agent's communication channel, and a representation 1520 of the party's speech component, e.g., the party's communication channel. Between the two representations 1515, 1520, a timeline 1525 is provided indicating the minutes into the communication. Further, icons for the search terms found in each communication channel are mapped out along the corresponding representation 1515, 1520. Controls 1540 can be used to increase or decrease the viewing scale of the overall timeline and representations 1515, 1520. This may be useful if the number of icons displayed appears very crowded.

In this instance, the representation 1515 of the agent's communication channel shows that the search term "Handle" 1530 was spoken by the agent around eleven minutes into the conversation. If the administrator is interested in listening to the audio between the agent and the party with respect to this particular instance of the search term 1530, then the administrator may select the audio play icon 1535 to listen to that particular portion of the audio. In this particular embodiment, the icon 1535 is located in proximity to the search term 1530 and selecting the icon 1535 causes the portion of the audio communication associated with that instance of the search term 1530 to be played. Similar types of representations may be provided in various embodiments for other types (channels) of communications such as Web chats and text message. For instance, a timeline may be provided on a GUI for a Web chat showing the exchange of chat messages back and forth between an agent and a remote party in which the agent's chat messages may be mapped along one side of the timeline and the party's chat messages mapped along the other side of the timeline at approximate locations where the messages took placed during the chat. Here, the search terms may be highlighted in the chat messages so that their occurrence can be more easily identified by the administrator. Those of ordinary skill in the art can envision other layouts of GUIs for displaying communications for review in light of this disclosure.

Exemplary Processing Device Architecture

Figure 16:
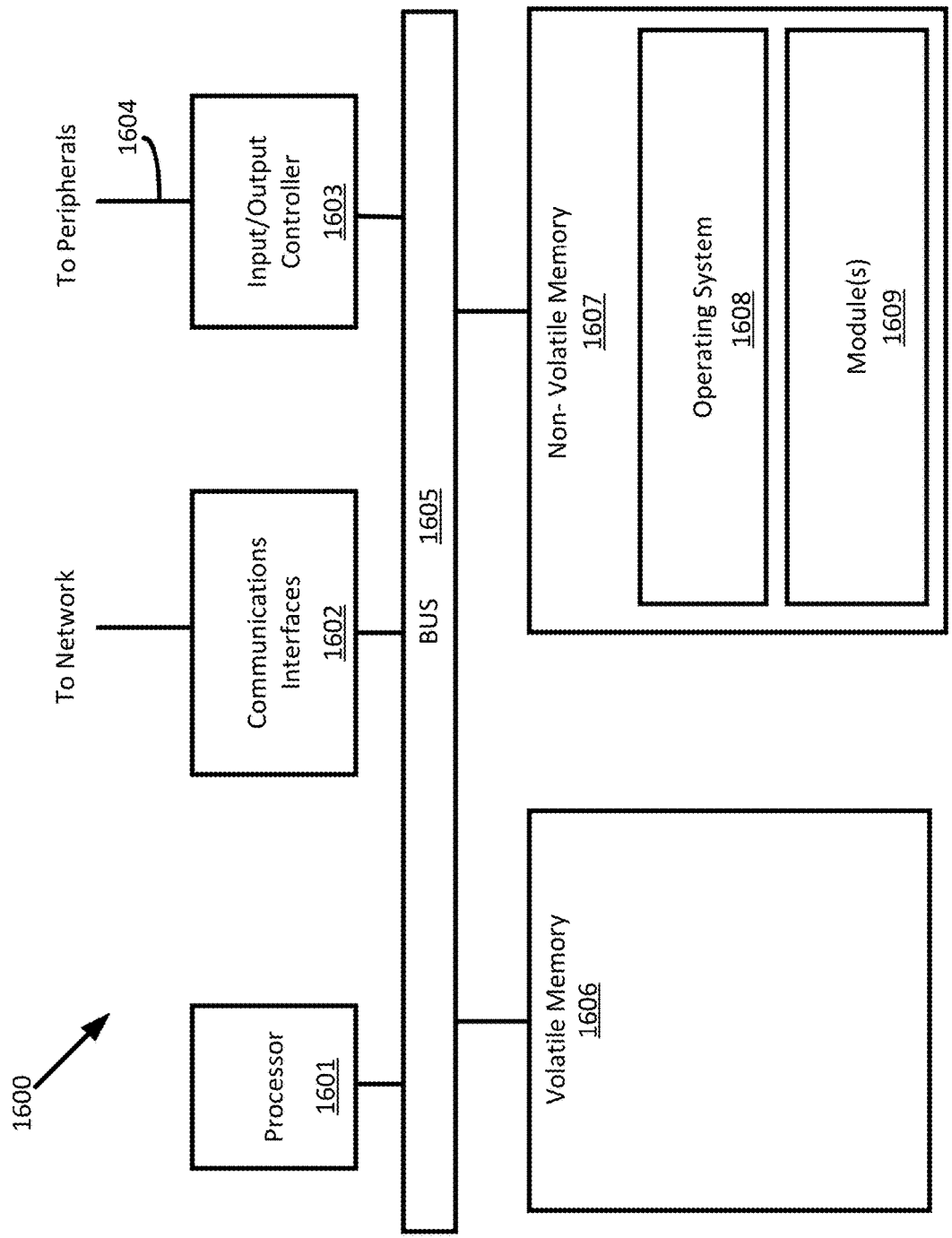
FIG. 16 illustrates an embodiment of a processing device for practicing various technologies and concepts disclosed herein.

As discussed in conjunction with FIG. 2, the contact center architecture 200 may comprise various components. Accordingly, FIG. 16 is an exemplary schematic diagram of a processing component 1600 that may be used in various embodiments of the contact center architecture 200 to practice the technologies disclosed herein such as, for example, the communications handler 250, the email server 235, the text gateway server 240, the web server 245, the analytics components 250, and/or an agent's computing device 260*a*-260*c*. In general, the term "processing component" may be exemplified by, for example, but without limitation: various types of computers, servers, blades, gateways, switches, and the like, as well as any combination of devices or entities adapted to perform the functions described herein.

As shown in FIG. 16, the processing component 1600 may include one or more processors 1601 that may communicate with other elements within the processing component 1600 via a bus 1605. The processor 1601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 1600 may also include one or more communication interfaces 1602 for communicating data via the local network with various external devices, such as other components of FIG. 2.

Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 1600 may further include an input/output controller 1603 that may communicate with one or more input devices or peripherals using an interface 1604, such as, but not limited to: a keyboard, a mouse, a touch screen/display input, microphone, pointing device, etc. The input/output controller 1603 may also communicate with output devices or peripherals, such as displays, printers, speakers, headsets, banner displays, etc.

The processor 1601 may be configured to execute instructions stored in volatile memory 1606, non-volatile memory 1607, or other forms of computer-readable storage media accessible to the processor 1601. The volatile memory 1606 may comprise various types of memory technologies, including, but not limited to: random access memory ("RAM"), dynamic random access memory ("DRAM"), static random access memory ("SRAM"), and other forms well known to those skilled in the art. The non-volatile memory 1607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1607 may store program code and data, which also may be loaded into the volatile memory 1606 at execution time. Specifically, the non-volatile memory 1607 may store one or more program modules 1609, such as the various modules described above containing instructions for performing the processes and/or functions associated with the technologies disclosed herein, and/or operating system code 1608. In addition, these program modules 1609 may also access, generate, or store data 1610, in the non-volatile memory 1607, as well as in the volatile memory 1606. The volatile memory 1606 and/or non-volatile memory 1607 may be used to store other information including, but not limited to: records, applications, programs, scripts, source code, object code, byte code, compiled code, interpreted code, machine code, executable instructions, or the like. These may be executed or processed by, for example, the processor 1601 and/or may form a part of, or may interact with, the program modules 1609.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

Further, those of ordinary skill in the art can envision other applications of various embodiments of the invention disclosed herein in addition to applications in a contact center environment in light of this disclosure. For example, applications of various embodiments of the invention may be used in a library environment having electronic materials such as recordings and books wherein individuals are conducting some type of analytics on the electronic materials to identify materials of interest. Therefore, it should be understood that various embodiments of the invention may be used in other environments besides a contact center.

The invention claimed is:

1. A method comprising:
    converting a plurality of audio communications by at least one computer processor into a plurality of text transcripts;
    converting the plurality of text transcripts by the at least one computer processor into a matrix representation;
    training a topic model by the at least one computer processor on the matrix representation to identify a plurality of topics that comprises one or more topics, wherein each topic in the plurality of topics comprises a cluster of similar words representing a latent semantic structure found in the plurality of audio communications and each word is weighted based on an importance of the word to the topic;
    receiving one or more search terms from a user;
    providing to the user on a display of a computer one or more synonyms for at least one of the search terms;
    receiving a selection made by the user of at least one of the one or more synonyms;
    identifying the one or more topics based on applying the topic model to the one or more search terms and the at least one selected synonym;
    providing to the user on the display of the computer the one or more identified topics;
    receiving a selection made by the user of at least one of the one or more topics;
    identifying an audio communication between a first party and a second party, the audio communication being associated with the at least one selected topic;
    analyzing words spoken during the audio communication by the at least one computer processor to identify occurrences where at least one of the search terms and the at least one selected synonym was spoken during the audio communication;
    providing a graphical user interface ("GUI") to the user on the display of the computer, the GUI comprising a timeline representing the audio communication;

displaying a plurality of icons on the GUI in conjunction with the timeline, wherein each icon represents one of the occurrences where at least one of the search terms and the at least one selected synonym was spoken during the audio communication and the icon is displayed on the GUI at a location with respect to the timeline proximate to a time of the occurrence where at least one of the search terms and the at least one selected synonym was spoken during the audio communication;

receiving an input from the user as a result of the user selecting a particular icon representing a particular occurrence where at least one of the search terms and the at least one selected synonym was spoken during the audio communication; and after receiving the input, playing a portion of the audio communication containing the particular occurrence where at least one of the search terms and the at least one selected synonym was spoken during the audio communication.

2. The method of claim 1 further comprising identifying the one or more synonyms by the at least one computer processor from one or more general thesauruses and a personal thesaurus associated with the user.

3. The method of claim 1 further comprising:
providing to the user on the display of the computer one or more definitions for at least one of the search terms; and
receiving a selection made by the user of at least one of the one or more definitions, wherein at least one of the one or more synonyms provided to the user is based on the selection.

4. The method of claim 1 further comprising:
identifying by the at least one computer processor a set of candidate labels for a particular topic of the one or more topics;
producing a score for each of the candidate labels in the set of candidate labels by the at least one computer processor based on semantic relevance; and
selecting one or more candidate labels for the particular topic with maximal marginal relevance criterion and with respect to a ranking of the score for each of the candidate labels.

5. The method of claim 1 further comprising:
generating a text document of an audio communication;
identifying one or more topics based on applying the topic model to the text document; and
recording the one or more topics as being associated with the audio communication.

6. A non-transitory, computer-readable medium comprising computer-executable instructions, that when executed, cause at least one computer processor to:
convert a plurality of audio communications into a plurality of text transcripts;
convert the plurality of text transcripts into a matrix representation;
train a topic model on the matrix representation to identify a plurality of topics that comprises the one or more topics, wherein each topic in the plurality of topics comprises a cluster of similar words representing a latent semantic structure found in the plurality of audio communications and each word is weighted based on an importance of the word to the topic;
receive one or more search terms from a user;
provide to the user on a display of a computer one or more synonyms for at least one of the search terms;
receive a selection made by the user of at least one of the one or more synonyms;
identify the one or more topics based on applying the topic model to the one or more search terms and the at least one selected synonym;
provide to the user on the display of the computer the one or more identified topics;
receive a selection made by the user of at least one of the one or more topics;
identify an audio communication between a first party and second party, the audio communication being associated with the at least one selected topic;
have words spoken during the audio communication analyzed to identify occurrences where at least one of the search terms and the at least one selected synonym was spoken during the audio communication;
provide a graphical user interface ("GUI") to the user on the display of the computer, the GUI comprising a timeline representing the audio communication;
display a plurality of icons on the GUI in conjunction with the timeline, wherein each icon represents one of the occurrences where at least one of the search terms and the at least one selected synonym was spoken during the audio communication and the icon is displayed on the GUI at a location with respect to the timeline proximate to a time of the occurrence where at least one of the search terms and the at least one selected synonym was spoken during the audio communication;
receive an input from the user as a result of the user selecting a particular icon representing a particular occurrence where at least one of the search terms and the at least one selected synonym was spoken during the audio communication; and
after receiving the input, play a portion of the audio communication containing the particular occurrence where at least one of the search terms and the at least one selected synonym was spoken during the audio communication.

7. The non-transitory, computer-readable medium of claim 6, wherein the computer-executable instructions cause the at least one computer processor to identify the one or more synonyms from one or more general thesauruses and a personal thesaurus associated with the user.

8. The non-transitory, computer-readable medium of claim 6, wherein the computer-executable instructions cause the at least one computer processor to:
provide to the user on the display of the computer one or more definitions for at least one of the search terms; and
receive a selection made by the user of at least one of the one or more definitions, wherein at least one of the one or more synonyms provided to the user is based on the selection.

9. The non-transitory, computer-readable medium of claim 6, wherein the computer-executable instructions cause the at least one computer processor to:
identify a set of candidate labels for a particular topic of the one or more topics;
produce a score for each of the candidate labels in the set of candidate based on semantic relevance; and
select one or more candidate labels for the particular topic with maximal marginal relevance criterion and with respect to a ranking of the score for each of the candidate labels.

10. The non-transitory, computer-readable medium of claim 6, wherein the computer-executable instructions cause the at least one computer processor to:
generate a text document of an audio communication;

identify one or more topics based on applying the topic model to the text document; and record the one or more topics as being associated with the audio communication.

11. A system comprising:

at least one computer processor configured to:

convert a plurality of audio communications into a plurality of text transcripts;

convert the plurality of text transcripts into a matrix representation;

train a topic model on the matrix representation to identify a plurality of topics that comprises the one or more topics, wherein each topic in the plurality of topics comprises a cluster of similar words representing a latent semantic structure found in the plurality of audio communications and each word is weighted based on an importance of the word to the topic;

receive one or more search terms from a user;

provide to the user on a display of a computer one or more synonyms for at least one of the search terms;

receive a selection made by the user of at least one of the one or more synonyms;

identify the one or more topics based on applying the topic model to the one or more search terms and the at least one selected synonym;

provide to the user on the display of the computer the one or more identified topics;

receive a selection made by the user of at least one of the one or more topics;

identify an audio communication between a first party and second party, the audio communication being associated with the at least one selected topic;

have words spoken during the audio communication analyzed to identify occurrences where at least one of the search terms and the at least one selected synonym was spoken during the audio communication;

provide a graphical user interface ("GUI") to the user on the display of the computer, the GUI comprising a timeline representing the audio communication;

display a plurality of icons on the GUI in conjunction with the timeline, wherein each icon represents one of the occurrences where at least one of the search terms and the at least one selected synonym was spoken during the audio communication and the icon is displayed on the GUI at a location with respect to the timeline proximate to a time of the occurrence where at least one of the search terms and the at least one selected synonym was spoken during the audio communication;

receive an input from the user as a result of the user selecting a particular icon representing a particular occurrence where at least one of the search terms and the at least one selected synonym was spoken during the audio communication; and after receiving the input, play a portion of the audio communication containing the particular occurrence where at least one of the search terms and the at least one selected synonym was spoken during the audio communication.

12. The system of claim 11, wherein the at least one computer processor is configured to identify the one or more synonyms from one or more general thesauruses and a personal thesaurus associated with the user.

13. The system of claim 11, wherein the at least one computer processor is configured to:

provide to the user on the display of the computer one or more definitions for at least one of the search terms; and receive a selection made by the user of at least one of the one or more definitions, wherein at least one of the one or more synonyms provided to the user is based on the selection.

14. The system of claim 11, wherein the at least one computer processor is configured to:

identify a set of candidate labels for a particular topic of the one or more topics;

produce a score for each of the candidate labels in the set of candidate based on semantic relevance; and select one or more candidate labels for the particular topic with maximal marginal relevance criterion and with respect to a ranking of the score for each of the candidate labels.

15. The system of claim 11, wherein the at least one computer processor is configured to:

generate a text document of an audio communication;

identify one or more topics based on applying the topic model to the text document; and record the one or more topics as being associated with the audio communication.

* * * * *